(12) United States Patent
Coffman et al.

(10) Patent No.: US 8,380,551 B2
(45) Date of Patent: Feb. 19, 2013

(54) METHOD AND SYSTEM FOR PROCESSING WORK REQUESTS

(75) Inventors: Mathew A. Coffman, Saint Charles, MO (US); Timothi A. Purcell, Warrenton, MO (US); Steven R. Estes, St. Peters, MO (US); John M. Gerardi, Wentzville, MO (US)

(73) Assignee: The Boeing Company, Chicago, IL (US)

( * ) Notice: Subject to any disclaimer, the term of this patent is extended or adjusted under 35 U.S.C. 154(b) by 535 days.

(21) Appl. No.: 12/265,010

(22) Filed: Nov. 5, 2008

(65) Prior Publication Data

US 2010/0114641 A1    May 6, 2010

(51) Int. Cl.
*G06Q 10/00* (2012.01)
(52) U.S. Cl. ............... 705/7.12; 705/7.26
(58) Field of Classification Search ........... 705/7.12, 705/7.26
See application file for complete search history.

(56) References Cited

U.S. PATENT DOCUMENTS

| | | | | |
|---|---|---|---|---|
| 6,161,113 | A * | 12/2000 | Mora et al. | 715/234 |
| 6,850,939 | B2 * | 2/2005 | Bostleman et al. | 709/223 |
| 6,970,861 | B2 * | 11/2005 | Messler | 1/1 |
| 7,072,940 | B1 * | 7/2006 | Day et al. | 709/204 |
| 7,171,652 | B2 * | 1/2007 | Motoyama et al. | 717/123 |
| 7,191,141 | B2 * | 3/2007 | Motoyama | 705/7.15 |
| 7,212,976 | B2 * | 5/2007 | Scheer | 705/7.34 |
| 7,212,987 | B2 * | 5/2007 | Swanke et al. | 705/7.15 |
| 7,559,049 | B1 * | 7/2009 | Hemmat et al. | 717/102 |
| 2002/0059109 | A1 * | 5/2002 | Takagi | 705/26 |
| 2003/0139962 | A1 * | 7/2003 | Nobrega et al. | 705/9 |
| 2003/0220875 | A1 * | 11/2003 | Lam et al. | 705/45 |
| 2004/0215618 | A1 * | 10/2004 | Wacke et al. | 707/10 |
| 2006/0095156 | A1 * | 5/2006 | Baiada et al. | 700/213 |
| 2006/0095373 | A1 * | 5/2006 | Venkatasubramanian et al. | 705/40 |
| 2007/0233510 | A1 * | 10/2007 | Howes | 705/1 |
| 2008/0103990 | A1 * | 5/2008 | Danielson et al. | 705/400 |
| 2008/0195506 | A1 * | 8/2008 | Koretz et al. | 705/27 |

OTHER PUBLICATIONS

"Tivoli IBM Maximo Adapter for Microsoft Project Release 6.2 Installation Guide", Copyright International Business Machines Corporation, 2006, 22 pages.
"Information:Paperless Assembly Data Delivery System (PADDS)", Table of Contents, Survey Summary, Best Manufacturing Practices Center of Excellence, Boeing Integrated Defense Systems, Original Date May 8, 1995, Revision Date Jan. 18, 2007, 10 pages.
"Manufacturing Execution Systems (MES)" definition from Wikipedia, http://en.wikipedia.org/wiki/Manufacturing_execution_system, Dec. 14, 2009, 2 pages.
"MES Functionalities & MRP to MES Data Flow Possibilities", MESA International—White Paper No. 2, MESA International, Pittsburgh, Pennsylvania, Updated and Revised Mar. 1997, pp. 1-8.

* cited by examiner

*Primary Examiner* — Johnna Loftis

(57) ABSTRACT

The disclosure is directed to a method and system for processing work requests, preferably prototype operations work requests (POWR). In one of the embodiments the method is an automated method to be performed in a computing environment for processing a work request. The method comprises the steps of receiving the work request, inputting the work request into an electronic database, creating electronic work request instructions, linking the electronic work request instructions to multiple networked computers, transmitting between the networked computers electronic notifications relating to the work request instructions, and providing service reports filtered on specific data of interest relating to history and completion of the work request.

45 Claims, 29 Drawing Sheets

FIG. 19

| ACCOUNT NAME | | PASSWORD | TYPE | USER NAME | DEPT | EMAIL |
|---|---|---|---|---|---|---|
| X | EDIT | POWR | CBU | ? | 193E | |
| X | EDIT | POWR | CBU | | | |
| X | EDIT | POWR | CBU | | | |
| X | EDIT | POWR | CBU | | | |
| X | EDIT | POWR | CBU | | | |
| X | EDIT | POWR | CBU | | | |
| X | EDIT | POWR | CBU | | | |
| X | EDIT | POWR | CBU | | | |
| X | EDIT | POWR | CBU | | | |
| X | EDIT | POWR | LEAD | | | |
| X | EDIT | POWR | CBU | | | |
| X | EDIT | POWR | BUS OPS | | | |
| X | EDIT | POWR | CBU | | | |
| X | EDIT | POWR | CBU | | | |

NOTE: APPROVERS MUST EACH HAVE A UNIQUE USER ID TO BE USED FOR APPROVAL RIGHTS. ALSO, CBU WORKERS WILL HAVE THEIR USER ID RECORDED FOR SIGNED OFF TASKS AND WILL HAVE ACCESS BASED ON THEIR DEPT.

ACCOUNT REPORT    CLOSE

ACCOUNT NAME    PASSWORD    CREATE ACCOUNT

FIG.21

ADVANCED OPERATIONS / PROTOTYPING
PROTOTYPE OPERATIONS WORK REQUEST (POWR)

POWR #: 836
STATUS: OPENED — 838

REFRESH — 832
CLOSE — 834

830

MAIN — 840 | ATTACHMENTS — 842 | MATERIALS — 844 | WORK — 846 | SUMMARY — 848

TITLE / DESCRIPTION: — 850

BACKGROUND / SUPPORTING INFO — 866

PROJECT/PROGRAM* — 852
OVERHEAD APPROVER: — 868

WORK PROVIDER TYPE* — 854
870 — PROCESS REQUIRED: CHARGE LIMIT WITHOUT APPROVAL:
[ ] HOURS

WORK PROVIDER LOCATION* — 856
872 — CHARGE NUMBER* (8 CHARACTERS ALLOWED) — 876

WORK PROVIDER POC — 858
DELIVER COMPLETED ITEM(S) TO: — 878

REQUESTING POC* — 860
TASK MANHOURS: — 880

ASSOCIATED REFERENCE NUMBER — 862
ADD ESTIMATE — 882 | VIEW HISTORY — 884 — 885

864 — *REQUIRED FIELD

REQUEST — 886 | APPROVE POWR — 888 | DECLINE POWR — 890 | CANCEL POWR — 892 | WORK POWR — 894 | POWR COMPLETED — 896 | RESET — 898

FIG. 24

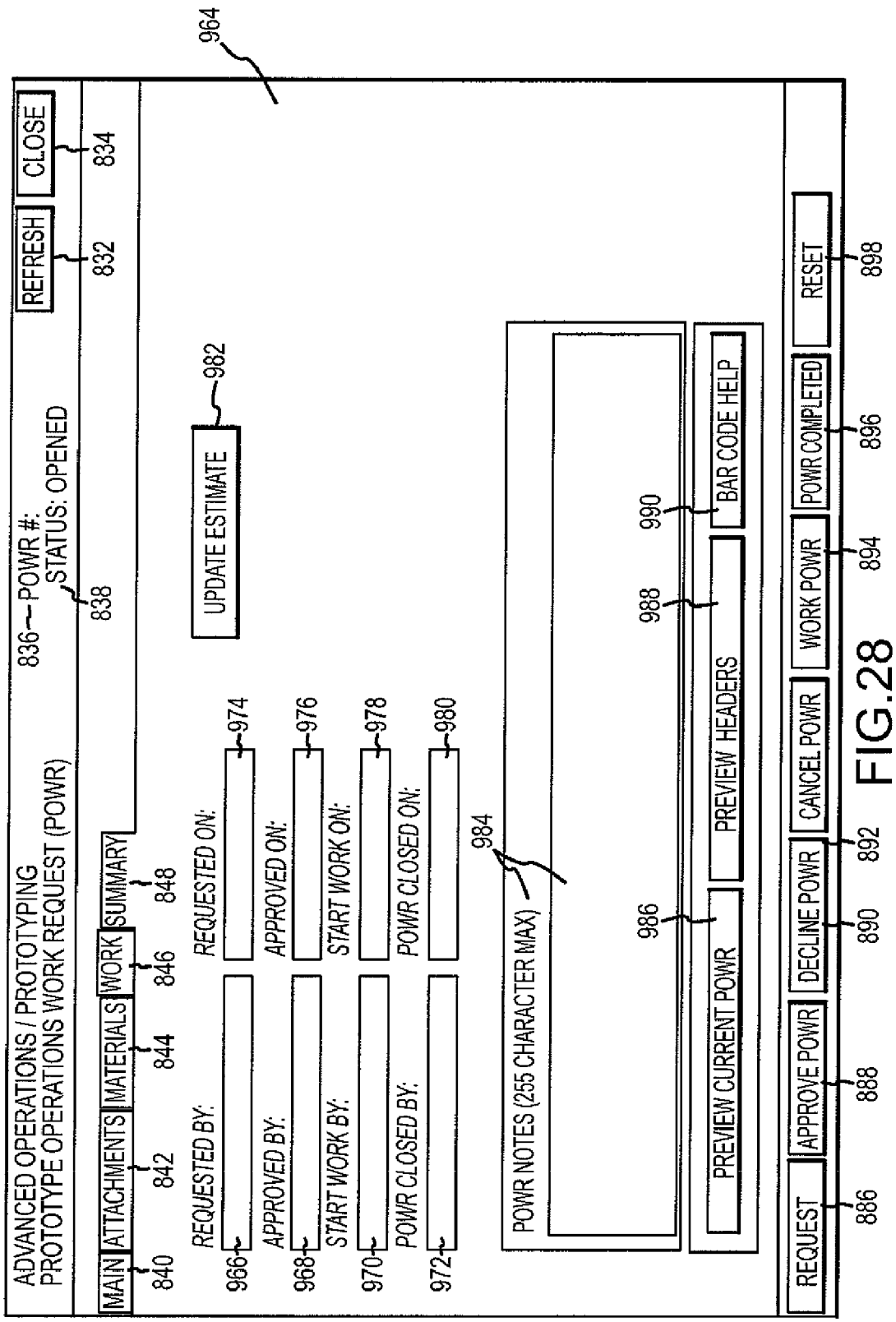

POWR REQUEST LIST

| ACTION | NUMBER | STATUS | REQUESTED | PROJECT/PROGRAM | PROVIDER | TITLE / DESCRIPTION |
|---|---|---|---|---|---|---|
| VIEW ✗ | 08-0096 | APPROVED | [DATE] | | | |
| VIEW ✗ | | IN-WORK | | | | |
| VIEW ✗ | | IN-WORK | | | | |
| VIEW ✗ | | IN-WORK | | | | |
| VIEW ✗ | | IN-WORK | | | | |
| VIEW ✗ | | APPROVED | | | | |
| VIEW ✗ | | IN-WORK | | | | |
| VIEW ✗ | | IN-REVIEW | | | | |
| VIEW ✗ | | APPROVED | | | | |
| VIEW ✗ | | IN-WORK | | | | |
| VIEW ✗ | | IN-WORK | | | | |
| VIEW ✗ | | IN-WORK | | | | |
| VIEW ✗ | | OPENED | | | | |
| VIEW ✗ | | APPROVED | | | | |
| VIEW ✗ | | IN-WORK | | | | |
| VIEW ✗ | | IN-WORK | | | | |

FIELD | VALUE | FIND | RESET | OPEN | CLOSED | ALL | CLOSE

FIG. 29

METHOD AND SYSTEM FOR PROCESSING WORK REQUESTS

BACKGROUND

1) Field

The disclosure relates to a method and system for processing work requests. More particularly, the disclosure relates to an automated method and system for processing a prototype operations work request (POWR).

2) Description of Related Art

Service providers, manufacturers, suppliers, customers, and other interested parties in various industries, such as the aerospace, automotive, engineering, manufacturing, product design, and other industries, typically use and process work requests on a daily basis. Such work requests are often used in connection with prototype services to produce and build prototypes or samples of products, parts, and the like. Product design validation, project completion deadlines, and time to market of a product or design typically rely on the accurate processing, quick turnaround, and efficient management of the prototype work order requests by prototype operations service providers. Known methods and systems exist for receiving and processing work order requests, including prototype operations work order requests. Some known methods and systems include receiving and processing work requests by way of direct contact verbal requests, telephone calls, e-mails, interdepartmental mail, and handwritten requests with attached sketches or drawings. However, such requests can be poorly communicated, documented incorrectly, or undocumented altogether. This can result in delays and inefficiencies in prototype service build and delivery and inefficiencies in work-in-process and work order archiving, which can create a challenging administrative environment in which to direct prototype operations service activities. Existing manual systems can require the work instruction hard copy to accompany the hardware, which can result in damaged or lost pages, as the hardware and accompanying work order are moved from location to location during the build process. In addition, existing manual systems can lack visibility of completion status regarding the work requests, if the work orders cannot be viewed in various locations or viewed simultaneously by builders, build coordinators, and other interested parties. Moreover, persons responding to such work requests may have to rely on memory, hard copy documentation, or manual data entry to account for their labor and the labor of others. This can result in inaccuracies in labor reporting, difficulties in controlling overhead budgets, and errors in service charges and costs. Reliance on memory or poorly documented requests can also limit task completion and control. In addition, vacations, personnel changes, distractions, and faulty filing by persons responding to such requests can cause delays, increased costs, and frustration.

Additional known methods and systems for processing work order requests, including prototype work order requests, include vendor supplied off-the-shelf software. However, such software typically requires licensing fees which can increase costs if multiple copies of the software are needed for multiple locations. In addition, such software can be inefficient as users are routinely required to manually input data to override system generated errors that may compromise labor reporting integrity. Moreover, since the vendor provides the same "off the shelf" software to multiple users, the vendor can refuse to make improvements to the software, citing the fact that other users would also have to want the same changes. Thus, making improvements to such software can be costly or may not even be an option. Finally, such software can require automated scheduling, common bill of materials, and pre-defined "next assembly" or "parent-child" relationships to be defined in order to function.

Additional known methods and systems for processing work order requests, including prototype work order requests, further include outsourcing or subcontracting of prototype work orders to third parties. However, such outsourcing or subcontracting can require expensive and detailed request documentation, including engineering drawings, price quotations, approved vendor certifications, and delivery schedules, and such outsourcing can incur purchase order processing expenses, supplier management expenses, and accounts payable expenses. Moreover, outsourcing may not be a feasible alternative if prototypes are of a proprietary or confidential nature and must be kept in-house.

Accordingly, there is a need for a method and system for processing work requests, including prototype operations work requests, that provide advantages over known methods and systems.

SUMMARY

This need for a method and system for processing work requests, including prototype operations work requests, is satisfied and numerous advantages are discussed herein. Embodiments of a method and system for processing work requests, including prototype operations work requests, may provide one or more of the following advantages: provides an automated method and system with a disciplined means of documenting service requests using databases and computer programs to create on-line electronic work instructions, transmit electronic notifications, provide real-time work completion status, and provide electronic and/or printed reports filtered on specific data of interest to the service provider and/or customers, or for individuals wanting to review archived requests; provides a method and system that accommodate electronic work request attachments and provide documentation of information that may include without limitation hardware configuration, requesting department, quantities of items/services delivered, and the charge number that funded the effort; provides a method and system that improve workload visibility by using one work order system that increases visibility of work completion and other aspects of the work request status for interested individuals, providers, and customers located in multiple locations and that allows work orders to be viewed in various locations simultaneously; provides a method and system that improve accountability for materials, delivery performance, prototype service cost, and prototype labor forecasting and staffing to satisfy work requests; provides a method and system that does not require common bill of materials or next assembly definition in order to function, and does not require manual input of data to override system generated errors that compromise labor reporting integrity; provides a method and system that reduce labor reporting and charging errors by providing an electronic charge number recording capability that associates each request with the appropriate charge number for the hardware or service requested; provides a method and system that incorporate an approval/disapproval feature to evaluate estimated costs of each service request based on estimated hours and to decide to either approve or disapprove the request prior to incurring any costs; provides a method and system that does not require a hard copy of the work instructions to accompany the hardware as the hardware is moved from location to location during the build process; provides a method and system that improve resource planning, improve control of overhead expenditures resulting from prototype service requests, facilitate creation of a labor baseline, and create a historical baseline from which to project future requirements; provides an economical and structured method and system by which prototype operations service requests are documented; provides a flexible method and system that eliminate unnecessary documentation for simple tasks and offer economical documentation consistent with complex tasks; provides a method and system that accommodate completion status of work-in-process tasks and allow access to archived service requests; and provides a method and system that may be used for processing work requests for building parts for spacecraft, aircraft, automobiles, watercraft, military vehicles, and other suitable vehicles and equipment.

In one of the embodiments of the disclosure, there is provided an automated method to be performed in a computing environment for processing a work request. The method comprises the steps of receiving the work request and inputting the work request into an electronic database. The method further comprises the steps of creating electronic work request instructions, linking the electronic work request instructions to multiple networked computers, and transmitting between the networked computers electronic notifications relating to the work request instructions. The method further comprises the step of providing service reports filtered on specific data of interest relating to history and completion of the work request.

In another embodiment of the disclosure, there is provided an automated method to be performed in a computing environment for processing a prototype operations work request (POWR). The method comprises the step of receiving the POWR. The POWR may comprise a service request, a hardware request, a manufacturing request, build instructions, general labor activities, archived records of requests, or a combination thereof. The method further comprises the step of inputting the POWR into an electronic database. The database comprises a shared server having a front-end database, a back-end database, and an attachment storage device. The method further comprises the steps of creating electronic POWR instructions, creating a sequenced series of tasks to be worked sequentially for accomplishing the POWR, and inputting and storing into the electronic database one or more attachments to the POWR. The attachments may be created by computer software. The method further comprises the steps of linking the electronic POWR instructions and tasks to multiple networked computers comprising personal computers and transmitting between the networked computers electronic notifications relating to the POWR instructions and tasks. The electronic notifications may comprise approval authority, authority to proceed, approval of the work request, revisions to the work request, updates to the work request, instructions for building, cancellation of the work request, completion of the work request, changes in quantity of items requested, and revised estimated hours to complete the request. The method further comprises the step of providing service reports filtered on specific data of interest relating to history and completion of the POWR. The service reports may be in a format comprising electronic format and print format. During the method the POWR comprises a status at any given time comprising opened status, in-review status, approved status, in-work status, worked status, completed status, and cancelled status.

In another embodiment of the disclosure, there is provided an automated method to be performed in a computing environment for processing a prototype operations work request (POWR). The method comprises the steps of inputting POWR data and instructions into an electronic database and inputting a sequenced series of POWR tasks to be worked sequentially for accomplishing the POWR and storing the POWR in the database. The method further comprises the steps of linking the POWR to multiple networked computers and transmitting between the multiple networked computers electronic notifications relating to revising, approving, building, and completing the POWR. The method further comprises the step of generating electronic service reports filtered on specific data of interest relating to history and completion of the POWR.

In another embodiment of the disclosure, there is provided an automated method for processing a prototype operations work request (POWR) to be performed in a computing environment comprising one or more computer communications and networking devices linking a shared server with multiple user terminals. The method comprises the step of receiving a POWR. The POWR may comprise a service request, a hardware request, a manufacturing request, build instructions, general labor activities, archived records of requests, or a combination thereof. The method further comprises the step of inputting POWR data and instructions into an electronic database. The database comprises the shared server having a front-end database, a back-end database, and an attachment storage device. The method further comprises the step of inputting a sequenced series of POWR tasks to be worked sequentially for accomplishing the POWR and storing the POWR in the database, wherein the POWR is in an opened status. The method further comprises the step of inputting and storing into the electronic database one or more attachments to the POWR, wherein the attachments are created by computer software. The method further comprises the step of linking the opened POWR to multiple networked computers comprising personal computers. The method further comprises the step of transmitting between the multiple networked computers electronic notifications relating to the POWR. The electronic notifications may comprise, (a) electronic approval notifications for revising and updating the POWR, wherein the POWR is in an in-review status; (b) electronic approval notifications for approving the POWR, wherein the POWR is in an approved status; (c) electronic notifications for instructions for building or aborting the POWR, wherein the POWR is in an in-work status; (d) electronic notifications for building the POWR, wherein the POWR is in a worked status; and, (e) electronic notifications for providing real-time completion status of the POWR, wherein the POWR is in a completed status. The method further comprises the step of generating electronic service reports at any POWR status filtered on specific data of interest relating to history and completion of the POWR, wherein the service reports are in a format comprising electronic format and print format.

In another embodiment of the disclosure, there is provided an automated system for use in a computing environment for processing a work request. The system comprises a shared server comprising a front-end database, a back-end database, and an attachment storage device. The shared server saves and retains a work request that is input into the server by a user. The system further comprises one or more computer communications and networking devices for linking the shared server with multiple user terminals, wherein the multiple user terminals comprise computers having network access for accessing the work request and sending and receiving information relating to the processing and completion of the work request. The system further comprises supporting electronics devices to assist the multiple user terminals in accessing the work request and sending and receiving information relating to the processing and completion of the work request.

In another embodiment of the disclosure, there is provided an automated system for use in a computing environment for processing a prototype operations work request (POWR), the POWR comprising a service request, a hardware request, a manufacturing request, build instructions, general labor activities, archived records of requests, or a combination thereof. The system comprises a shared server comprising a front-end database, a back-end database, and an attachment storage device, wherein the shared server saves and retains the POWR that is input into the server by a user, and further wherein the attachment storage device saves and stores one or more attachments created by computer software to the POWR. The system further comprises one or more computer communications and networking devices for linking the shared server with multiple user terminals, wherein the multiple user terminals comprise personal computers having network access for accessing the POWR and sending and receiving information relating to the processing and completion of the POWR, and further wherein the multiple user terminals comprise a start POWR database link, a copy or update from front-end database feature, and a run front-end on local terminal feature. The system further comprises supporting electronics devices to assist the multiple user terminals in accessing the POWR and sending and receiving information relating to the processing and completion of the POWR, wherein the supporting electronics devices comprise input devices selected from the group comprising scanners, bar code readers, and cameras, and further comprise output devices selected from the group comprising printers and displays.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 19 is a sixth graphical user interface display of one of the embodiments of the POWR method and system of the disclosure;

FIG. 21 is an eighth graphical user interface display of one of the embodiments of the POWR method and system of the disclosure;

FIG. 24 is an eleventh graphical user interface display of one of the embodiments of the POWR method and system of the disclosure;

FIG. 28 is a fifteenth graphical user interface display of one of the embodiments of the POWR method and system of the disclosure;

FIG. 29 is a sixteenth graphical user interface display of one of the embodiments of the POWR method and system of the disclosure; and, FIG. 30 is a seventeenth graphical user interface display of one of the embodiments of the POWR method and system of the disclosure.

DETAILED DESCRIPTION

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The method and system of the disclosed embodiments may be used in connection with various applications relating to work requests, and in particular, prototype operations work requests (POWR). Accordingly, one of ordinary skill in the art will recognize and appreciate that the method and system of the disclosure can be used in any number of applications involving work requests, including prototype operations work requests.

Figure 1:
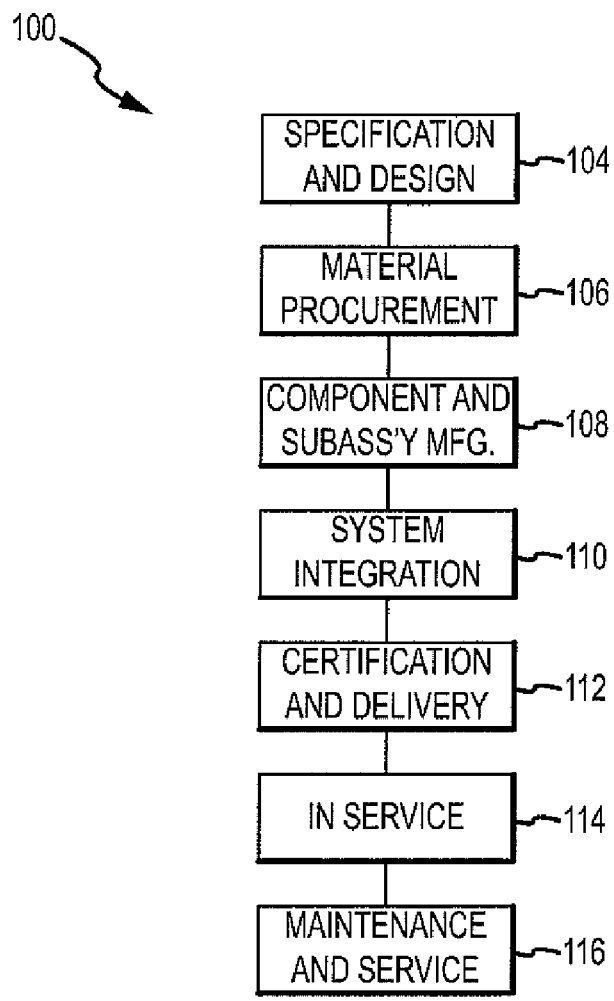
FIG. 1 is a flow diagram of aircraft production and service methodology.
Figure 2:
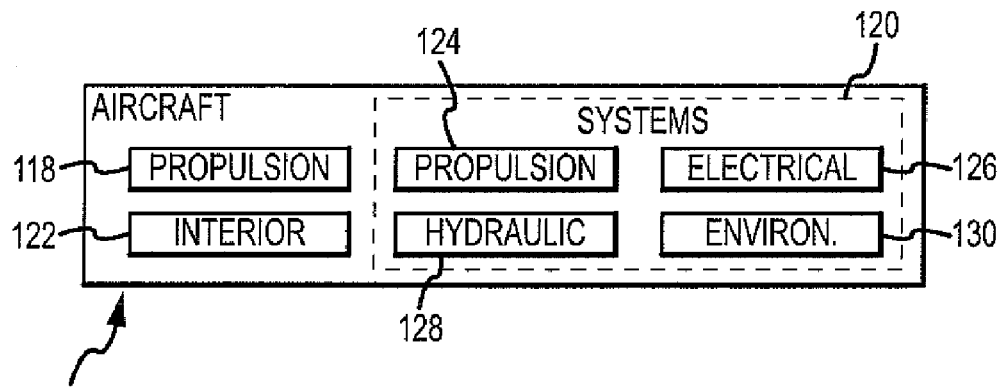
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof, may be utilized while the aircraft 102 is in service, for example and without limitation, to maintenance and service 116.

Figure 3:
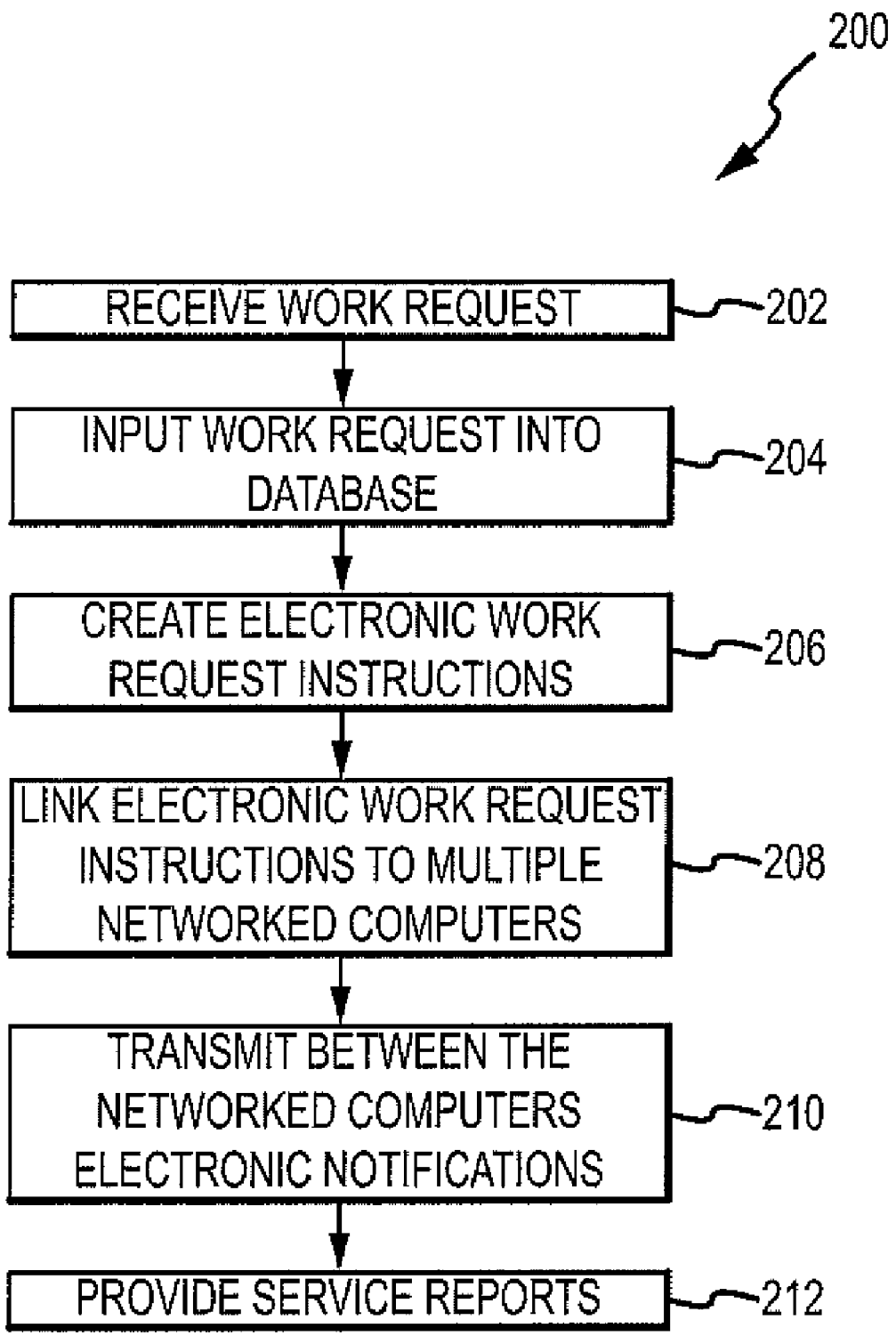
FIG. 3 is a flow diagram of one of the embodiments of the method for processing a work request of the disclosure.

FIG. 3 shows one of the embodiments of a method 200 for processing a work request. Preferably, the method is automated and can be performed in a computing environment. Preferably, the work request is a prototype operations work request (POWR). The exemplary method 200, as well as other embodiments of disclosed methods, may be performed or carried out in full or in part, by various interested parties including without limitation a user, writer, requester, administrator, work lead, shop foreman, builder, build coordinator, work provider, worker, operator, business operations person, central business unit (CBU) person, lead person, general person, management (MGT) person, manager, delegate person, reviewer, approver, overhead approver, work contact, point of contact, customer, supplier, vendor, service provider, or other interested individuals or parties. The exemplary method 200 may comprise the steps of receiving the work request 202, inputting the work request into database 204, creating electronic work request instructions 206, linking electronic work request instructions to multiple networked computers 208, transmitting between the networked computers electronic notifications 210, and providing service reports 212. The work requests received may include without limitation service requests, hardware requests, manufacturing requests, build instructions, general labor activities, archived records of requests, or a combination thereof, or other suitable requests. For example, hardware requests may include without limitation fabrication of highly complex hardware, such as integrally stiffened composite lay-ups, assembly, and delivery. Service requests may include without limitation making and installing labels on kit boxes or on shop aids, repairing part storage containers, repairing of part or tool holding fixtures, or fabricating retirement plaques. A service request may also comprise a general request for charge tracking purposes linked to any activity. Once the work request is received, it can be input into a database in exemplary system 300 (see FIG. 4). Preferably, the embodiments of the method disclosed may be used for processing work requests for building parts for spacecraft, aircraft, automobiles, watercraft, military vehicles, and other suitable vehicles and equipment.

Figure 4:
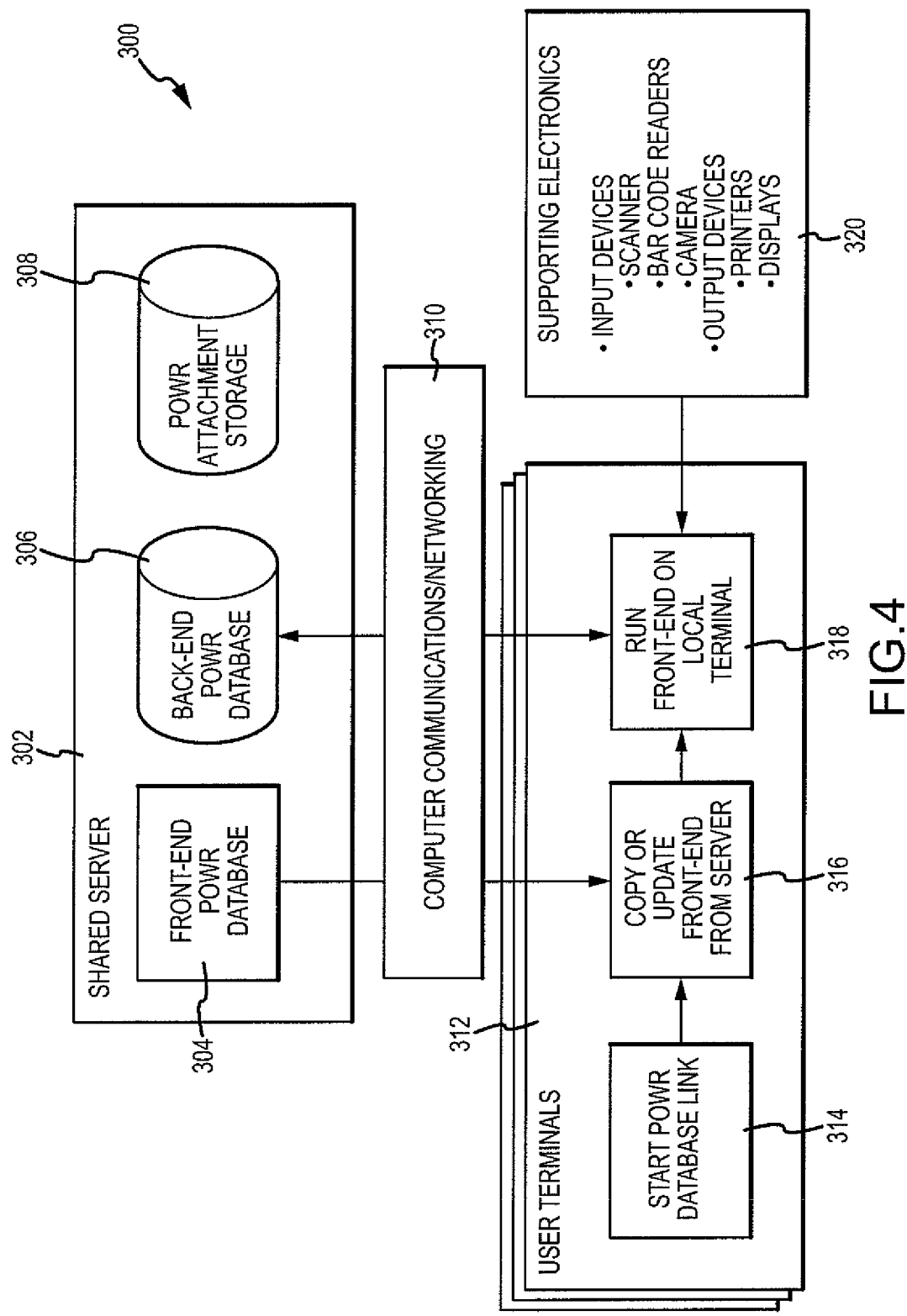
FIG. 4 is a block diagram of one of the embodiments of the system for processing a work request of the disclosure.

As shown in FIG. 4, one of the embodiments of the system 300 for processing a work request, preferably a POWR, is shown. The exemplary system 300 comprises a shared server 302. The shared server 302 comprises a front-end database 304, and preferably a front-end POWR MICROSOFT (MS) ACCESS database. (MICROSOFT ACCESS is a registered trademark of Microsoft Corporation of Redmond, Wash.). The shared server 302 further comprises a back-end database 306, and preferably, a back-end POWR MS ACCESS database. The shared server may also use other suitable database management systems. The shared server 302 further comprises an attachment storage device 308, and in particular, a POWR attachment storage device for saving and storing attachments (discussed in greater detail below in connection with FIG. 25). The shared server 302 saves, stores and retains the work requests and POWRs once they are received and input into the front-end database 304. The system 300 further comprises one or more computer communications/networking devices 310 for linking the shared server 302 with multiple user terminals 312. The computer communications/networking devices 310 may comprise a network server or may be modified to exist on a stand alone personal computer. The user terminals 312 may include without limitation a personal computers with a start POWR database link 314, a copy or update front-end from server feature 316, and a run front-end on local terminal feature 318. The user terminals 312 have network access for accessing the work request and sending and receiving information relating to the processing and completion of the work request. The system 300 further comprises supporting electronics devices 320. The supporting electronics devices 320 may assist the multiple networked user terminals 312 in accessing the work requests and sending and receiving information relating to the processing and completion of the work requests. The supporting electronics devices 320 may comprise input devices (see FIG. 4) such as scanners, bar code readers, cameras, or other suitable input devices. The supporting electronics 320 may also comprise output devices (see FIG. 4) such as printers, displays, or other suitable output devices. The system may optionally comprise additional electronics devices that may include without limitation light pens (not shown), thumb drives (not shown), electronic sensors (not shown), auxiliary drives (not shown), portable electronic data storage devices (not shown), and electronic transmitters (not shown), which in an exemplary application may be used for improving accurate labor reporting. The system may also be easily modified to another database type or may be web-based on a global computer network (the Internet).

As shown in FIG. 3, after the step 204 of inputting the work request into the database, a user may proceed with the step 206 of creating electronic work request instructions. The work request instructions or POWR may be stored on the shared server 302 (FIG. 4). The POWR work request displays for inputting information and work request instructions are shown in FIGS. 24-28, and are discussed in greater detail below in connection with FIGS. 24-28. For example, a POWR work request display 830 or form (see FIG. 24) with a main tab 840 open allows a user to input POWR data and instructions in various field boxes including without limitation title/description of the request 850, project/program 852, work provider type 854, work provider location 856, work provider POC 858, requesting POC 860, associated reference number 862, background/supporting information 866, overhead approver 868, hours 872, charge number 876, and task manhours estimate 882. Other suitable work request data may also be included. A POWR work request display 910 or form (see FIG. 26) with a materials tab 844 open allows a user to input materials information in various field boxes including without limitation task materials 912 needed for the work requested, location of materials 920, material certification 928, and other information on the materials 922. Other suitable materials information may also be included. A POWR work request display 940 or form (see FIG. 27) with a work tab 846 open allows a user to input work information in various field boxes including without limitation tasks 944, task number 946, required department 948, quantity 950, estimated completion date 952, task description 954, and assign material 956. Other suitable task information may also be included. A POWR work request display 964 or form (see FIG. 28) with a summary tab 848 open allows a user to input work request summary information in various field boxes including without limitation requested by 966, requested on (date) 974, approved by 968, approved on (date) 976, start work by 970, start work on (date) 978, POWR closed by 972, and POWR closed on (date) 980. Other suitable summary information may also be included. The step 206 of creating electronic work request instructions may further comprise the step of creating a sequenced series of tasks to be worked sequentially for accomplishing the work request so that the work request is in in-review status (see FIG. 8). In addition, the method 200 may further comprise the step of inputting and storing into the electronic database one or more attachments to the work request. The attachments are preferably created by computer software. A POWR work request display 900 or form (see FIG. 25) with an attachments tab 842 open allows a user to input attachments information at attachments box 902. Other suitable attachments information may also be included. The attachments may be stored in attachment storage 308 in the shared server 302 (see FIG. 4).

As shown in FIG. 3, after the step 206 of creating electronic work request instructions, a user may proceed with the step 208 of linking the electronic work request instructions to multiple networked computers or user terminals 312 (see FIG. 4). As shown in FIG. 4, the computer communications/networking devices 310 link the work request instructions and information stored in the shared server 302 with the multiple user terminals 312. After the linking the electronic work request instructions to multiple networked computers step 208, a user may proceed with the step 210 of transmitting between the networked computers or user terminals 312 electronic notifications relating to the work request instructions, such as e-mail notifications 662 shown in POWR display 644 of FIG. 16. The electronic notifications may be displayed in each user's inbox upon selection of the e-mail notification 662 as shown in display 644 of FIG. 16. Other suitable electronic notifications may also be used. The electronic notifications may relate to processing of the work request data and instructions and providing real-time completion status of the work request. The electronic notifications may include without limitation e-mail notifications to notify the writer or user of cancelled status (see 460 of FIG. 7), to notify the writer or user that the POWR is declined (see 492 of FIG. 8), to notify the writer or user and work lead to start work (see 500 of FIG. 8), to notify the work contact or lead that the POWR or work is approved (see 516 of FIG. 9), and to notify the writer or user that the work is completed (see 540 of FIG. 10).

Figure 30:
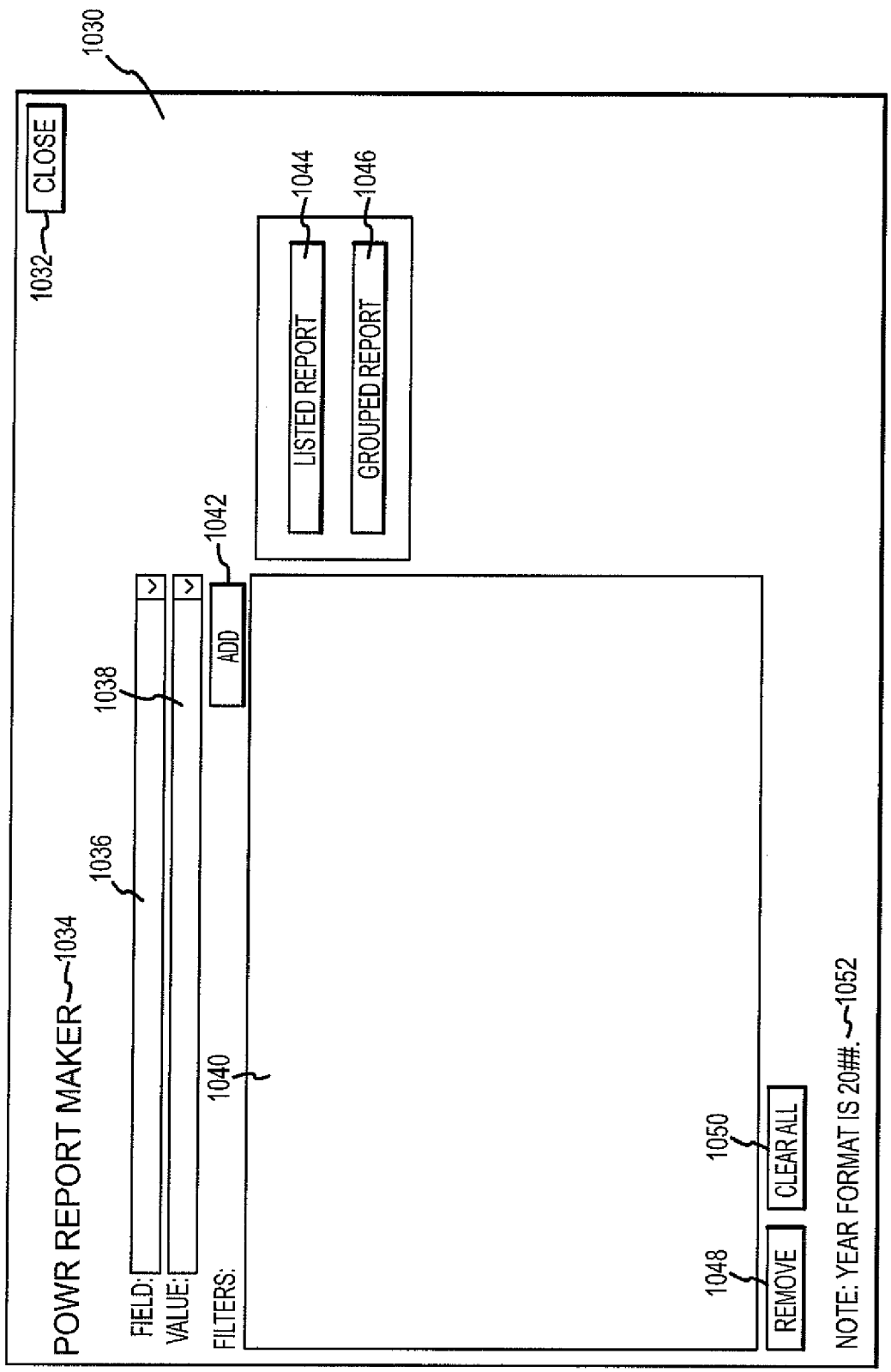

After the transmitting between the networked computers electronic notifications step 210, a user may proceed with the step 212 of providing or generating service reports 608, such as shown in POWR display 600 in FIG. 14 and such as shown in FIG. 30, both of which are discussed in greater detail below. The service reports may be filtered on specific data of interest relating to history and completion of the work request. The service reports may be in electronic format, print format, or another suitable format. The service reports provide workload visibility and can be used as a baseline for predicting future labor and budget requirements.

Figure 5:
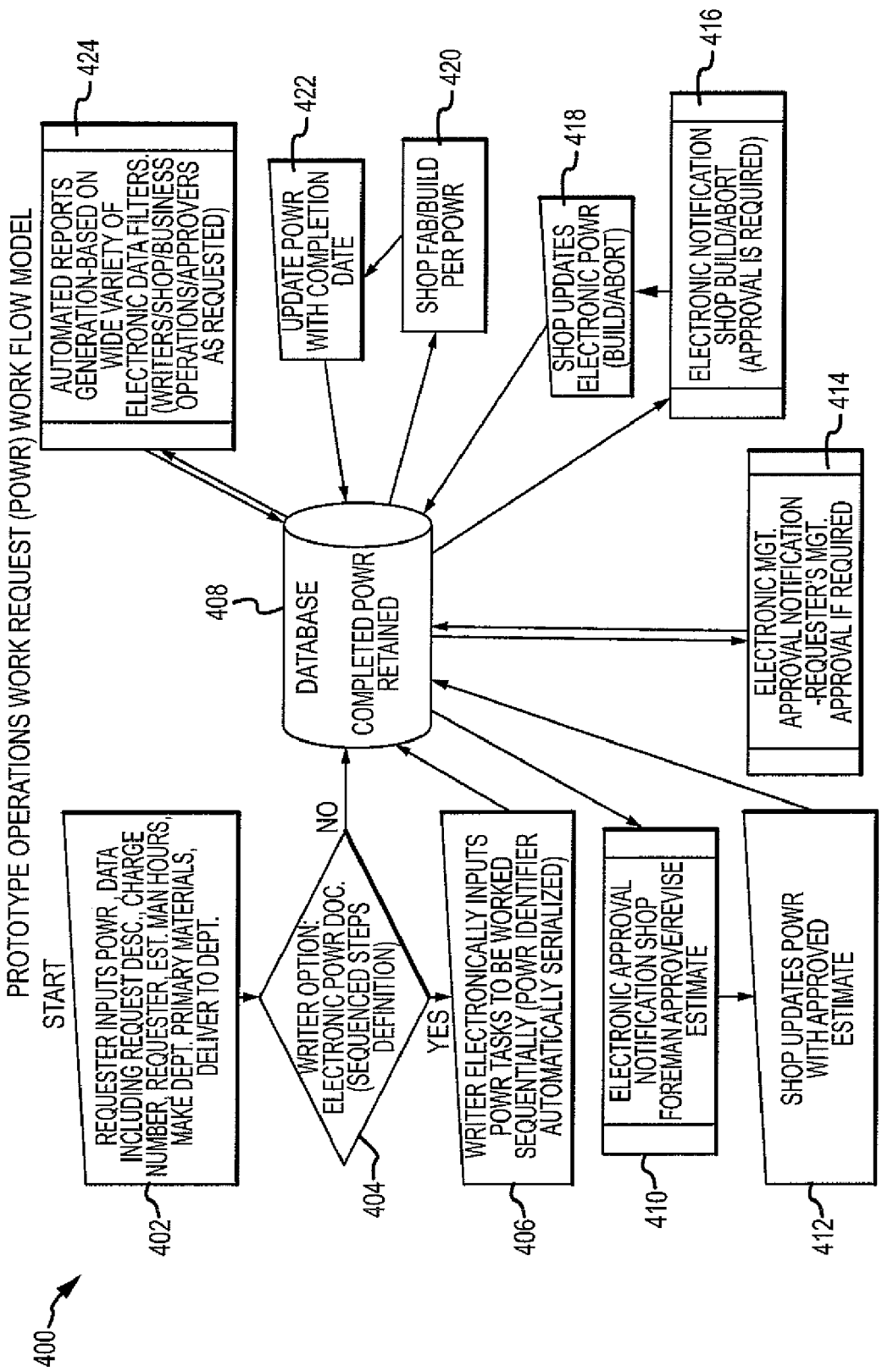
FIG. 5 is a block diagram of one of the embodiments of the prototype operations work request (POWR) work flow model of the disclosure.

FIG. 5 is a diagram of a more detailed work flow model or method 400 of one of the embodiments of the POWR method of the disclosure. Preferably, the method is automated and can be performed in a computing environment or system such as shown in FIG. 4. The exemplary method of this embodiment comprises an initial step 402 of the requester or user inputting POWR data and instructions into database 408, preferably an electronic database, such as discussed above and shown in FIG. 4. All of the input from various steps of the method is stored in database 408. In addition, after any change in information to the POWR, such information proceeds to database 408 for storage. The POWR data and instructions that may be input via POWR work request displays 830, 900, 910, 940, and 964, are shown in FIGS. 24-28, and are discussed in greater detail below in connection with FIGS. 24-28. The method further comprises step 404 of allowing the requester or writer the option of creating sequenced series of steps for the POWR. If the requester or writer decides "NO" on creating sequenced series of steps for the POWR, no specific tasks are recorded in the POWR, and the POWR proceeds to storage in database 408 and the POWR is in opened status 432 (see FIG. 6 and FIG. 7). If the requester or writer decides "YES" on creating sequenced series of steps for the POWR, step 406 where the requester or writer electronically inputs specific tasks in the POWR to be worked sequentially, is conducted. Once the specific tasks are input in the POWR, the POWR proceeds to storage in database 408 and the POWR is in opened status 432 (see FIG. 6 and FIG. 7). Once the POWR is opened, it can proceed to various steps, including but not limited to, electronic approval notification 410 by those with authority, such as shop foremen or administrators, for adding or revising information to the POWR, and updating the POWR with approved estimate 412 and other information. At this point the POWR is in in-review status 434 (see FIG. 6 and FIG. 8). Once the POWR in-review status is finished, the POWR returns to database 408. When the writer or user believes the POWR is completed, the writer or user may submit the POWR for approval notification 414. At this point the POWR is in approved status 436 (see FIG. 6 and FIG. 9). Once the POWR is approved, it is sent back to the database 408. The POWR may then proceed to electronic notification for a shop to build/abort POWR 416, and then to shop updates POWR 418. At this point the POWR is in in-work status 438 (see FIG. 6 and FIG. 10). Once the POWR in-work status is finished, the POWR is sent back to the database 408. The POWR may then proceed to shop fabrication and build per POWR instructions 420, and update POWR with completion date 422. This is the worked status 440 (see FIG. 6 and FIG. 11) and completed status 442 (see FIG. 6). Once the POWR worked status and completed status are finished, the POWR is sent back to the database 408. The POWR stored in the database 408 may be used at any stage in the generation of automated service reports 424 based on various electronic data base filters 1040 (see FIG. 30) which can be input into the report maker display 1030 as shown in FIG. 30, and which is discussed in greater detail below. Examples of data base filters may include without limitation writers, shop, business options, approvers as requested, or other desired filters.

Figure 6:
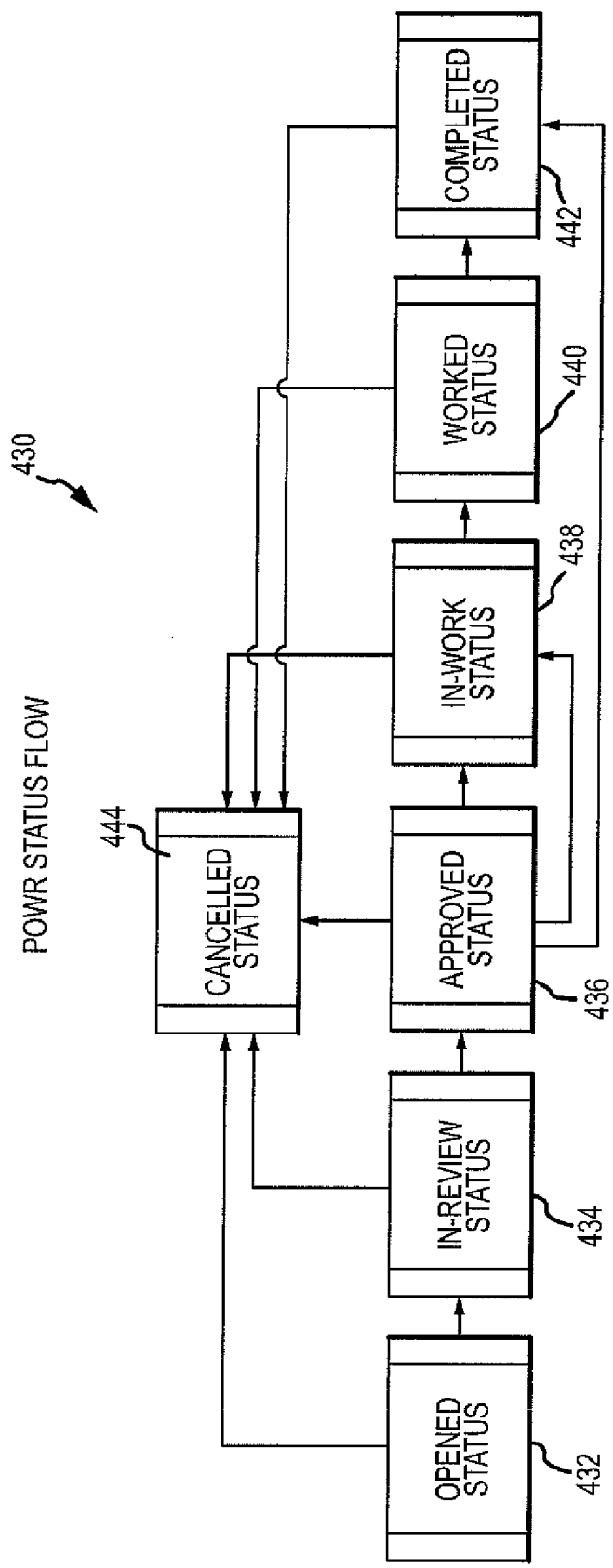
FIG. 6 is a POWR status flow diagram of one of the embodiments of the method and system of the disclosure.

FIG. 6 shows one of the embodiments of the POWR work request status flow 430 through the disclosed method and system. The chronological flow preferably comprises opened status 432, in-review status 434, approved status 436, in-work status 438, worked status 440, and completed status 442, each discussed in greater detail below. If any status needs to be cancelled, cancelled status 444 is used. Changing of a POWR status may be controlled by user attributes or abilities set by a system administrator along with the natural flow shown in FIG. 6.

Figure 7:
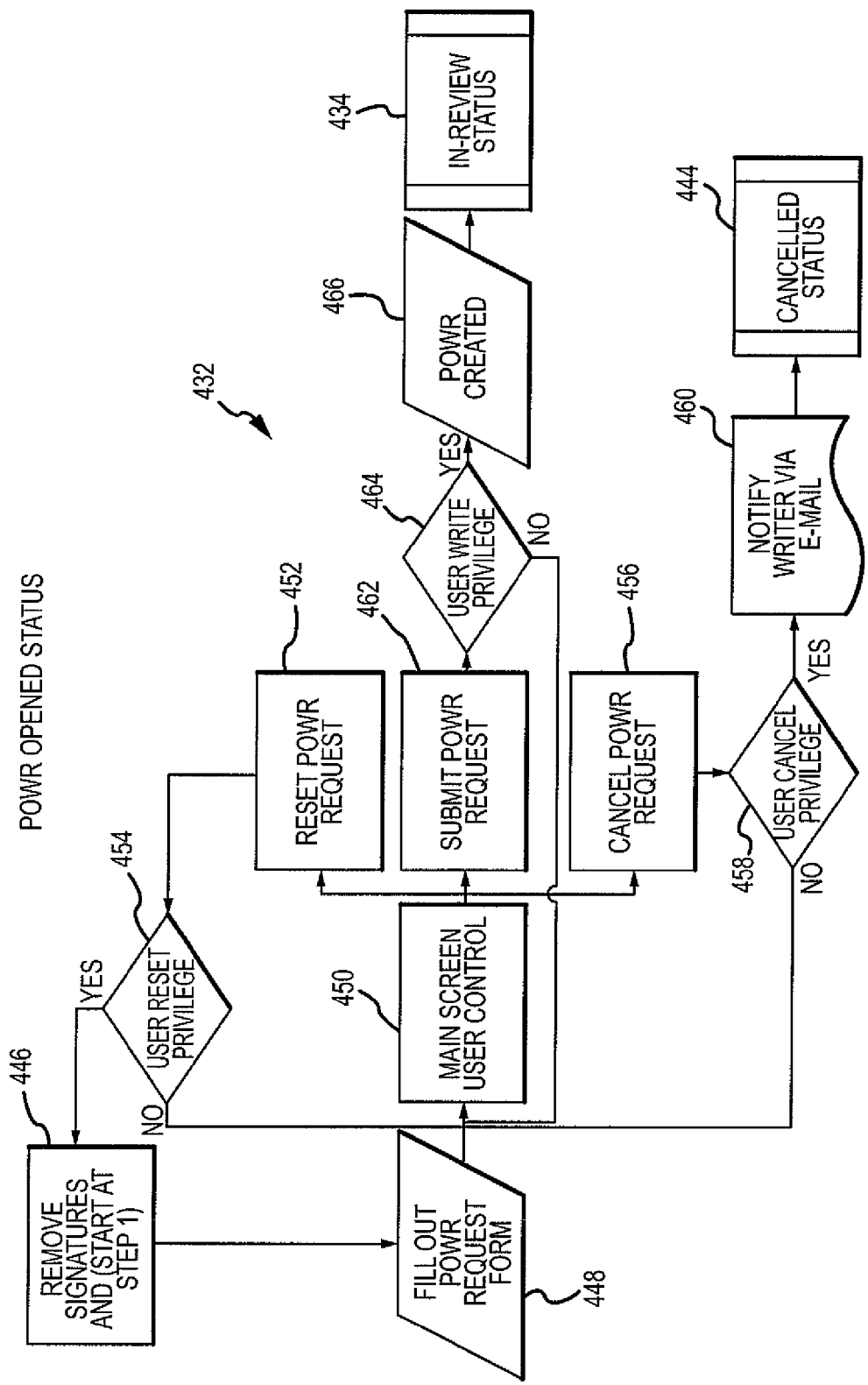
FIG. 7 is a POWR opened status flow diagram of one of the embodiments of the method and system of the disclosure.
Figure 10:
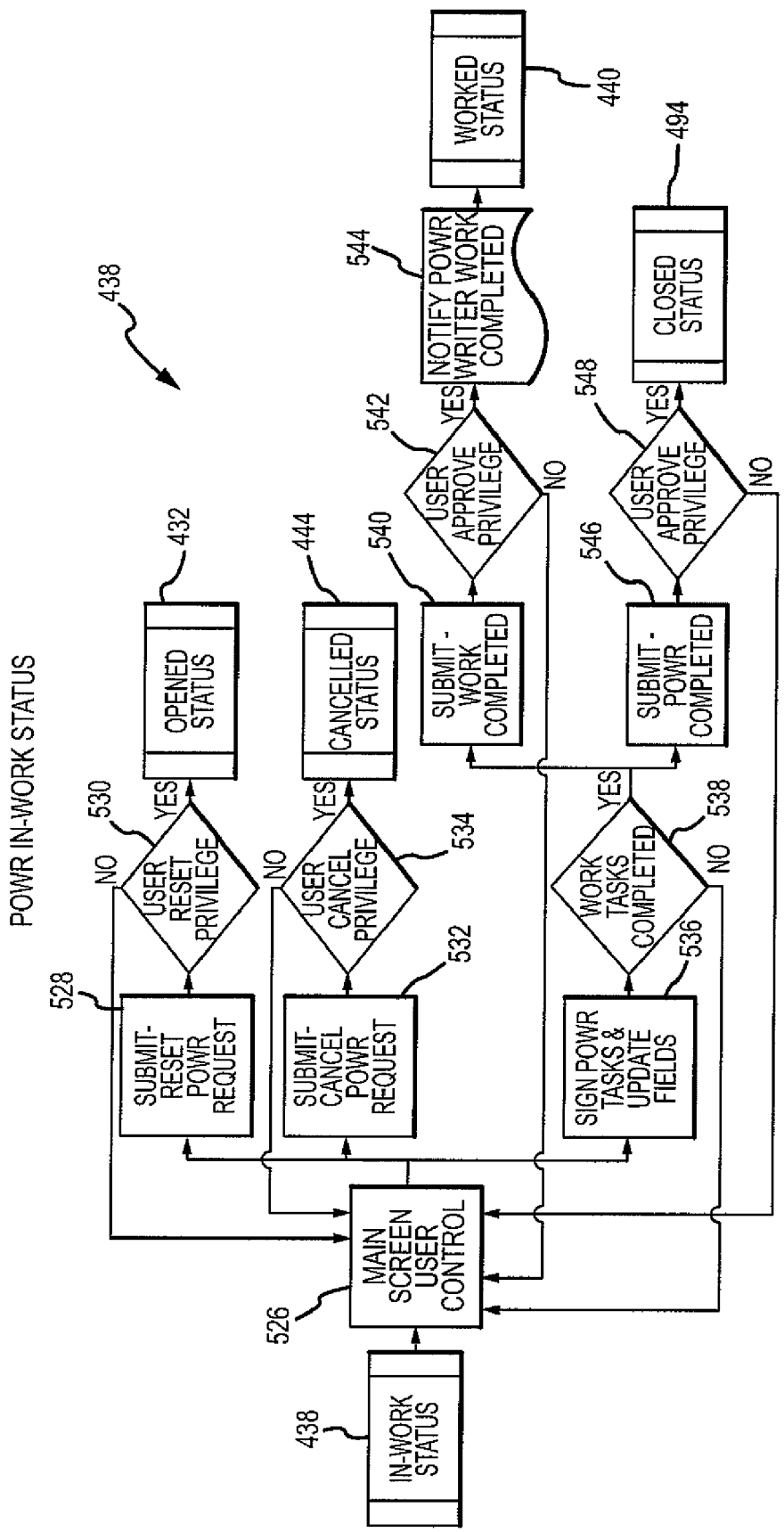
FIG. 10 is a POWR in-work status flow diagram of one of the embodiments of the method and system of the disclosure.
Figure 11:
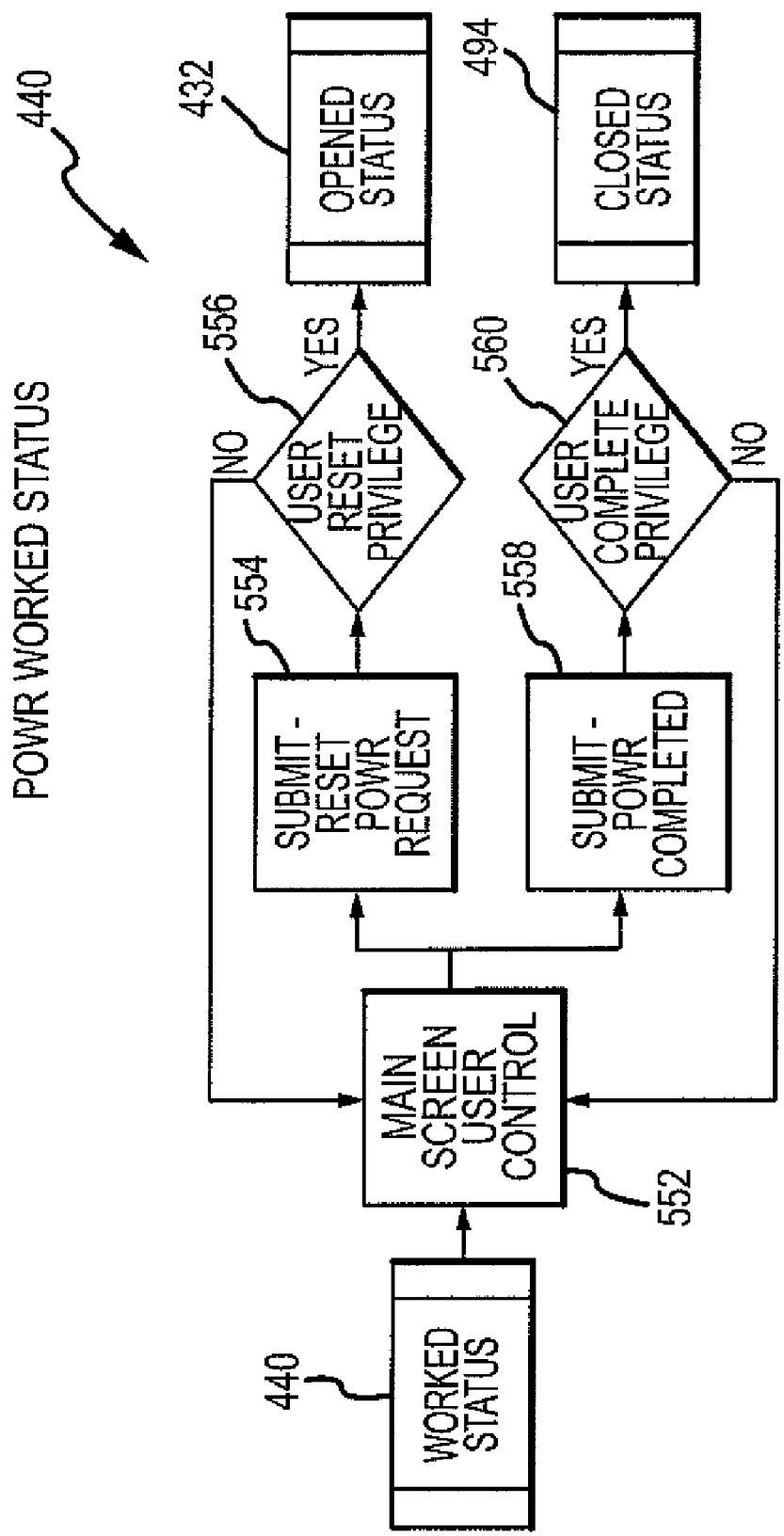
FIG. 11 is a POWR worked status flow diagram of one of the embodiments of the method and system of the disclosure.
Figure 12:
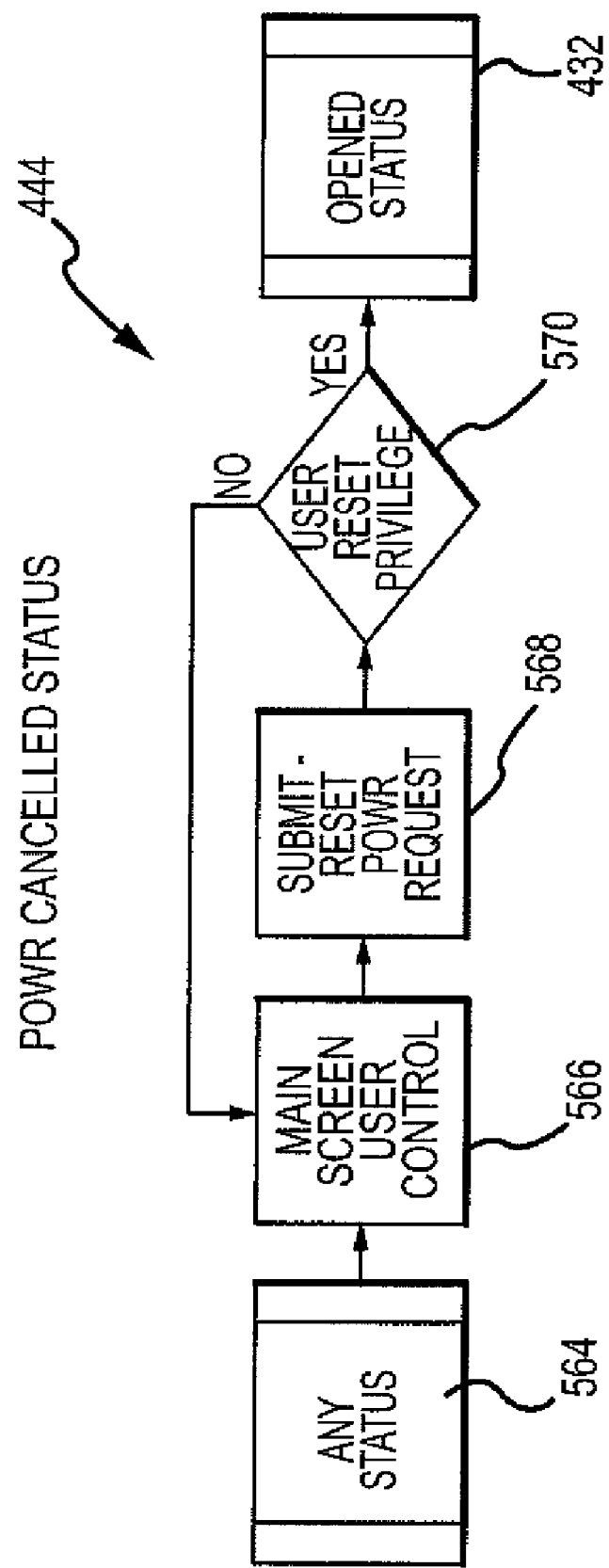
FIG. 12 is a POWR cancelled status flow diagram of one of the embodiments of the method and system of the disclosure.

FIGS. 7-13 show each status as set forth in FIG. 6 in greater detail. The programming flow charts of FIGS. 7-13 illustrate how the POWR method and system have been designed for quality control, recordation of user interaction, and allowance for multiple work flow paths. FIG. 7 shows one of the embodiments of the opened status 432 process. The POWR opened status 432 process begins when an authorized POWR user or writer conducts a fill out POWR request form step 448. A POWR request form button 606 (see FIG. 14) can be chosen to access a POWR request display 830 (see FIG. 24). The user or writer then proceeds to main screen user control 450. The user who has database authority to write a POWR request can access a main tab 840 (see FIG. 24) on the POWR request display 830 (see FIG. 24) and fill out all required information and additional information on the POWR request display 830 or form. When all required and additional information has been input, as determined by the user, there are three steps the user can take, including reset POWR request 452, submit POWR request 462, or cancel POWR request 456. Access to each step is determined by account access set up by the administrator. If reset POWR request 452 is chosen, the user proceeds to user reset privilege 454. If YES, and user reset privilege and authority has been granted to the user by the administrator, the user proceeds to remove signatures 446, where any signature/approval information stored in the database for the POWR request being worked is erased. The user then proceeds to the initial fill out POWR request form step 448 of the POWR opened status 432. If NO, and user reset privilege is not granted to the user, the user may proceed to either user cancel privilege 458 or user write privilege 464. If cancel POWR request 456 is chosen, the user also proceeds to user cancel privilege 458. If YES, and user cancel privilege and authority has been granted to the user, a notify writer (user) via e-mail step 460 is taken, and the POWR request is put into cancelled status 444 and can no longer be worked. The cancelled status 444 process is discussed in detail below and is shown in FIG. 12. If submit POWR request 462 is chosen, the user proceeds to user write privilege 464. If YES, and user write privilege and authority has been granted by the administrator, the user proceeds to POWR created 466 to create the POWR request in the POWR system, and then the user submits the POWR request to in-review status 434, which is discussed in more detail below and shown in FIG. 8.

Figure 8:
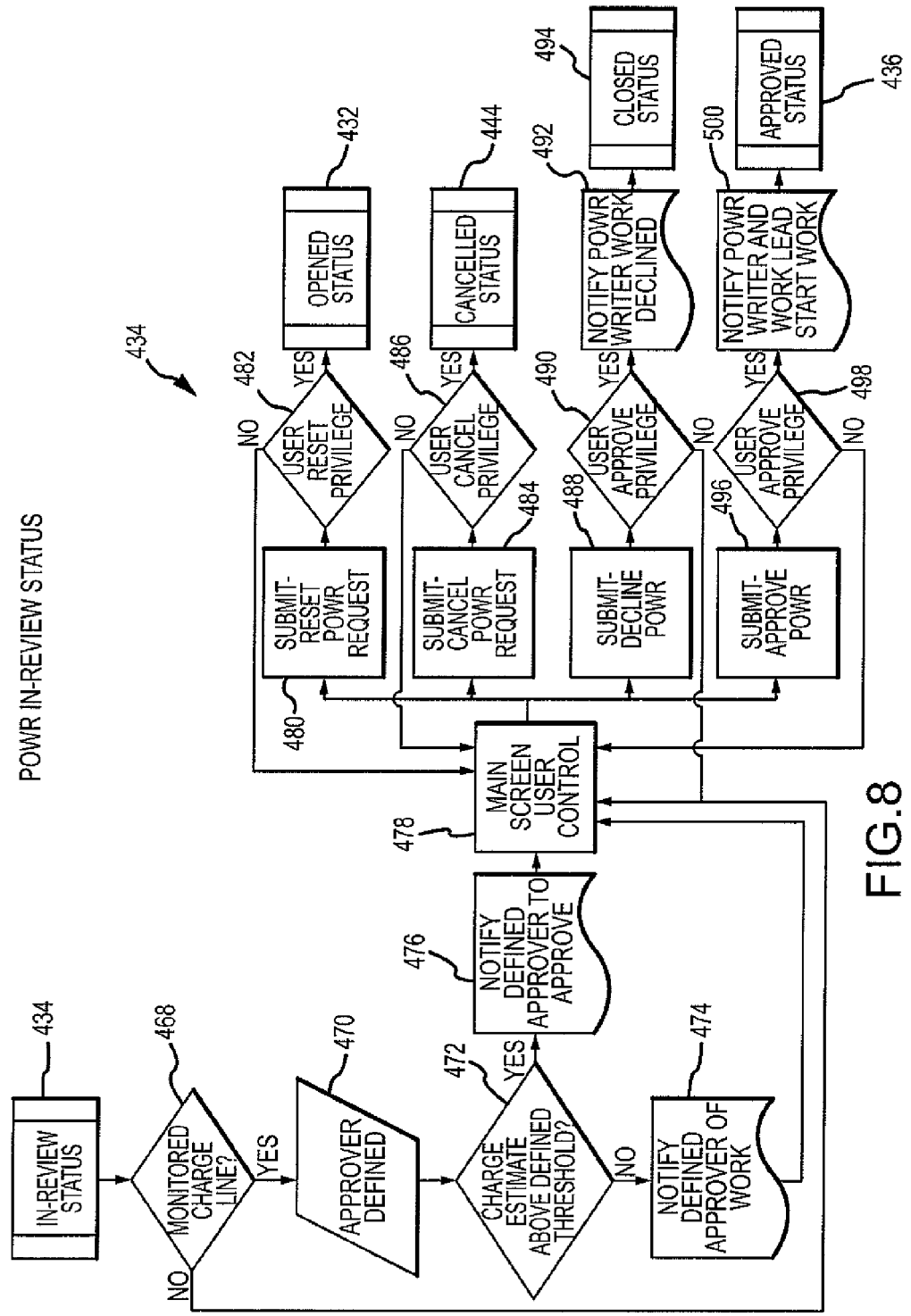
FIG. 8 is a POWR in-review status flow diagram of one of the embodiments of the method and system of the disclosure.

FIG. 8 shows one of the embodiments of the POWR in-review status 434 process. The in-review status 434 process proceeds from the opened status 432 process when the POWR request has been submitted for review. The in-review status 434 begins with a monitored charge line step 468. If NO, and the charge line is not monitored, a user with approval authority granted by the administrator can approve the request and can proceed to main screen user control 478. If YES, and the charge line entered into the POWR request is considered monitored or set by the administrator prior to the POWR request creation, then the user proceeds to approver defined 470, and then to a charge estimate above defined threshold 472. The database identifies the approver defined signature, along with a charge estimate threshold set by the administrator prior to the POWR request creation. If YES, and the charge estimate is above the defined threshold, the user proceeds to notify defined approver to approve 476. The identified approver's signature is required to proceed, and an e-mail may be sent to the approver displaying the POWR request and asking for approval. If NO, and the charge estimate is below the defined threshold, the user proceeds to notify defined approver of work step 474. A user with approval authority granted by the administrator can approve the request, and a notification e-mail may be sent to the identified approver. Once the approval authorities have been set, users again operate the POWR system using main screen user control 478. During the in-review status 434 process, information cannot be added to the POWR request except by those who have approval authority set previously in this process. From main screen user control 478, a user can choose from four steps, including submit-reset POWR request 480, submit-cancel POWR request 484, submit-decline POWR 488, and submit-approve POWR 496. Access to each step is determined by account access set up by the administrator. If submit-reset POWR request 480 is chosen, the user proceeds to user reset privilege 482. If YES, and user reset privilege and authority has been granted by the administrator, the signature/approval information stored in the database for the POWR request being worked is erased, and the POWR request is returned to the opened status 432 (see FIG. 7). If NO, and the user reset privilege has not been granted, the user returns to main screen user control 478. If submit-cancel POWR request 484 is chosen, the user proceeds to user cancel privilege 486. If YES, and cancel privilege authority has been granted to the user, the cancel POWR request process puts the POWR request into cancelled status 444 (see FIG. 12), and the POWR request can no longer be worked. An e-mail may be sent to the signed user or writer of the POWR request notifying the user that the request has been cancelled. If NO, and the user cancel privilege has not been granted, the user returns to main screen user control 478. If submit-decline POWR 488 is chosen, the user proceeds to user approve privilege 490. If YES, and user approve privilege has been granted to the user, the user proceeds to notify POWR writer (user) work declined 492, and the decline POWR request process puts the POWR request permanently into closed status 494 (see FIG. 13). The signature and date for disapproval may be stored in the POWR system. If NO, and the user approve privilege has not been granted, the user returns to main screen user control 478. If submit-approve POWR 496 is chosen, the user proceeds to user approve privilege 498. If YES, and the user approve privilege has been granted to the user, the user proceeds to a notify POWR writer (user) and work lead to start work 500, and the start work POWR request process puts the POWR request into approved status 436 (see FIG. 9). An e-mail notification may be sent to the POWR user or writer that work has been approved. If NO, and there is no user approve privilege, the user returns to main screen user control 478.

Figure 9:
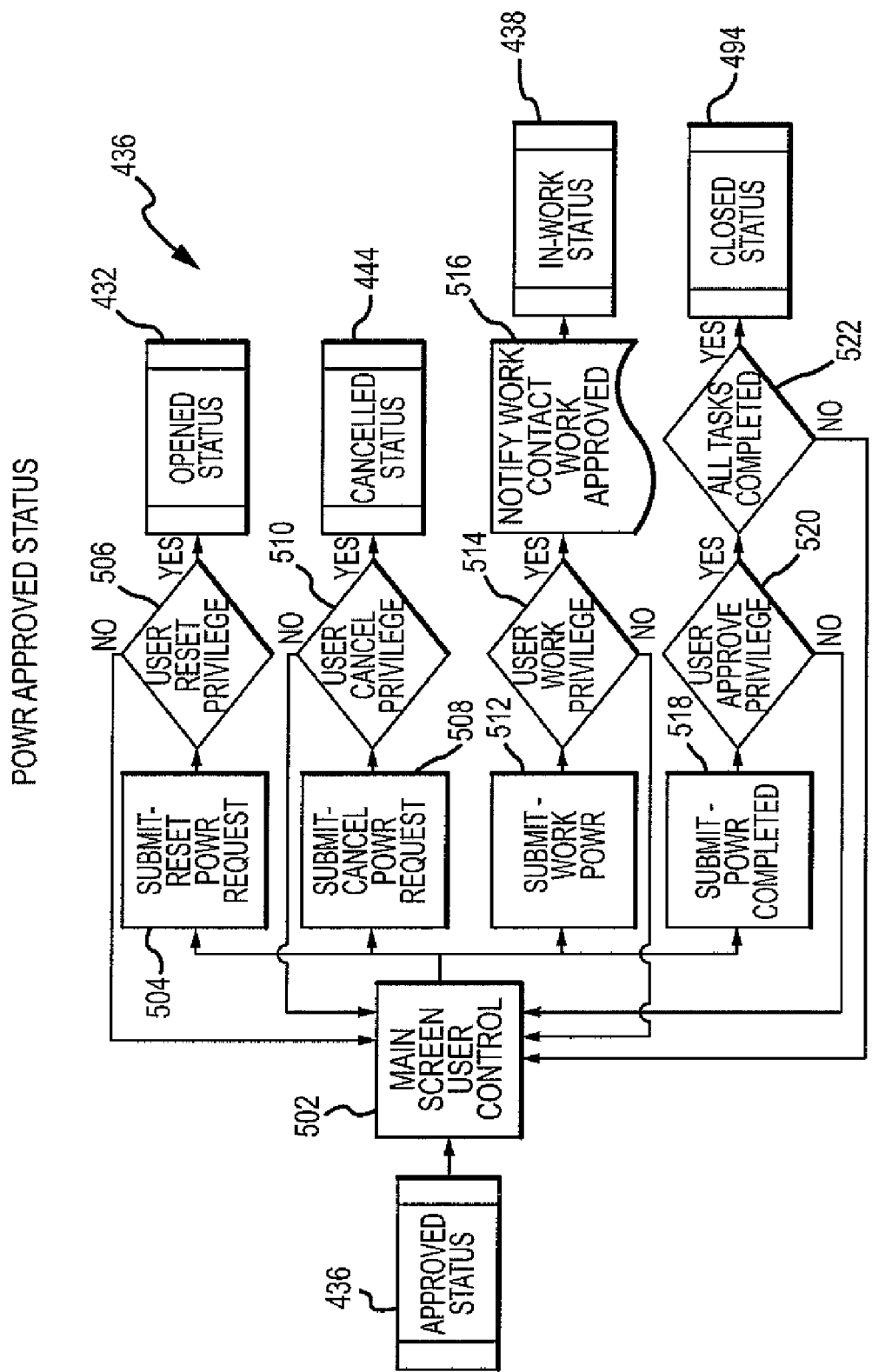
FIG. 9 is a POWR approved status flow diagram of one of the embodiments of the method and system of the disclosure.

FIG. 9 shows one of the embodiments of the POWR approved status 436 process. The approved status 436 process proceeds from the in-review status 434 process when the POWR request has been approved. The approved status 436 begins with approved users proceeding to main screen user control 502. Users can choose between four steps, including submit-reset POWR request 504, submit-cancel POWR request 508, submit-work POWR 512, and submit-POWR completed 518. Access to each step is determined by account access set up by the administrator. If submit-reset POWR request 504 is chosen, the user proceeds to user reset privilege 506. If YES, and user reset privilege and authority has been granted by the administrator, the signature/approval information stored in the database for the POWR request being worked is erased, and the POWR request is returned to the opened status 432 (see FIG. 7). If NO, and there is no user reset privilege, the user returns to main screen user control 502. If submit-cancel POWR request 508 is chosen, the user proceeds to user cancel privilege 510. If YES, and the user cancel privilege and cancel authority has been granted to the user, the cancel POWR request process puts the POWR request into cancelled status 444 (see FIG. 12), and the POWR request can no longer be worked. An e-mail notification may be sent to the signed user or writer of the POWR notifying the user or writer that the POWR request has been cancelled. If NO, and the user cancel privilege has not been granted, the user returns to main screen user control 502. If submit-work POWR 512 is chosen, the user proceeds to user work privilege 514. If YES, and the user work privilege and authority has been granted by the administrator, the user proceeds to notify work contact work approved 516, and the work POWR request process notifies the assigned work manager that work can begin, and puts the POWR request into in-work status 438 (see FIG. 10). If NO, and the user work privilege has not been granted, the user returns to main screen user control 502. If submit-POWR completed 518 is chosen, the user proceeds to user approve privilege 520. If YES, and the user approve privilege has been granted to the user, the user proceeds to all tasks completed 522, and the POWR completed process places the POWR request in closed status 494 (see FIG. 13). A completion signature and date may be added to the POWR system. If NO, and the user approve privilege has not been granted, the user returns to main screen user control 502.

FIG. 10 shows one of the embodiments of the POWR in-work status 438 process. The in-work status 438 process proceeds from the approved status 436 process when the POWR request has been approved and work can be initiated. The in-work status 438 begins with approved users proceeding to main screen user control 526. Users may control the POWR system from the main screen. During this in-work status process, access to update POWR tasks and sign-off work is granted to users identified by the administrators as workers, and can further be controlled by the user or writer identifying worker types. Users can choose between three steps, including submit-reset POWR request 528, submit-cancel POWR request 532, and sign POWR tasks and update fields 536. Access to each step is determined by account access set up by the administrator. If submit-reset POWR request 528 is chosen, the user proceeds to user reset privilege 530. If YES, and user reset privilege and authority has been granted to the user by the administrator, the signature/approval information stored in the database for the POWR request being worked is erased, and the POWR request is returned to the opened status 432 (see FIG. 7). If NO, and the user reset privilege has not been granted, the user returns to main screen user control 526. If submit-cancel POWR request 532 is chosen, the user proceeds to user cancel privilege 534. If YES, and the user cancel privilege and cancel authority has been granted to the user, the cancel POWR request process puts the POWR request into cancelled status 444 (see FIG. 12), and the POWR request can no longer be worked. An e-mail notification may be sent to the signed user or writer of the POWR notifying the user or writer that the POWR request has been cancelled. If NO, and the user cancel privilege has not been granted, the user returns to main screen user control 526. If sign POWR tasks and update fields 536 is chosen, the user proceeds to work tasks completed 538. If NO, and the work tasks are not completed, the user returns to main screen user control 526. If YES, and the work tasks are completed, the user may choose from two steps including submit-work completed 540 and submit-POWR completed 546. If submit-work completed 540 is chosen, the user proceeds to user approve privilege 542. If YES, and the user approve privilege and authority is granted to the user by the administrator, and all tasks have been completed, the user proceeds to notify POWR writer (user) of work completed 544, and the work completed process notifies the user or writer that the work is complete or done. The POWR request is then put into worked status 440 (see FIG. 11). A manager signature and date may be added to the POWR system. If NO, and the user approve privilege has not been granted, the user returns to main screen user control 526. If submit-POWR completed 546 is chosen, the user proceeds to user approve privilege 548. If YES, and the user approve privilege has been granted to the user, and all tasks have been worked, the POWR completed process puts the POWR request in closed status 494 (see FIG. 13). A completion signature and date may be added to the POWR system. If NO, and the user approve privilege has not been granted, the user returns to main screen user control 526.

FIG. 11 shows one of the embodiments of the POWR worked status 440 process. The worked status 440 process proceeds from the in-work status 438 process when the POWR request work is completed. The worked status 440 begins with approved users proceeding to main screen user control 552. Users may control the POWR system from the main screen. Because the work has been completed, no additional information may be added to the POWR system, except updating the charge estimate. After main screen user control 552, users can choose between two steps, including submit-reset POWR request 554 and submit-POWR completed 558. Because the work has been performed, the POWR request cannot be cancelled. The reset option is left available for those with reset authority in the instance where additional scope or tasks needs to be added to the POWR request. IF submit-reset POWR request 554 is chosen, the user proceeds to user reset privilege 556. If YES, and the user reset privilege and authority has been granted to the user by the administrator, the signature/approval information stored in the database for the POWR request being worked is erased, and the POWR request is returned to the opened status 432 (see FIG. 7). If NO, and the user reset privilege has not been granted, the user returns to main screen user control 552. If submit-POWR completed 558 is chosen, the user proceeds to user complete privilege 560. If YES, and the user complete privilege and authority has been granted to the user, and all tasks have been worked, the POWR completed process puts the POWR request into closed status 494 (see FIG. 13), and the POWR request can no longer be worked. A completion signature and date may be added to the POWR system. If NO, and the user complete privilege has not been granted, the user returns to main screen user control 552.

FIG. 12 shows one of the embodiments of the POWR cancelled status 444 process. The cancelled status 444 process proceeds from any status 564. The cancelled status 444 begins with approved users proceeding from any status 564 to main screen user control 566. From the main screen user control step 566, a user proceeds to submit-reset POWR request 568. Because the POWR request has been cancelled, the only option available to a user is to use the reset POWR request process. If submit-reset POWR request 568 is chosen, the user proceeds to user reset privilege 570. If YES, and the user reset privilege and authority has been granted to the user, the signature/approval information stored in the database for the POWR request being worked is erased, and the POWR request is returned to the opened status 432 (see FIG. 7). If NO, and the user reset privilege has not been granted, the user returns to main screen user control 564.

Figure 13:
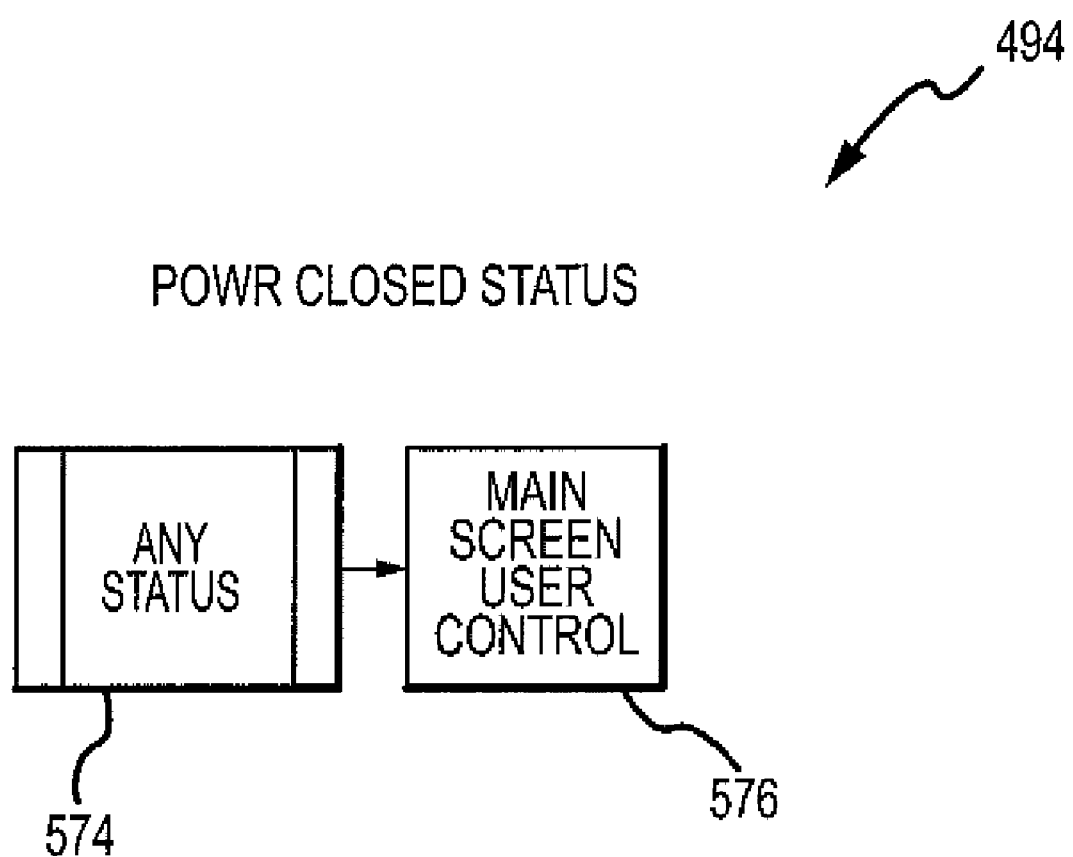
FIG. 13 is a POWR closed status flow diagram of one of the embodiments of the method and system of the disclosure.

FIG. 13 shows one of the embodiments of the POWR closed status 494 step. The closed status 494 begins with approved users proceeding from any status 574 to main screen user control 576. Because the POWR request has been closed/completed, users may only view main screen user control for information.

FIGS. 14-30 show various graphical user interface displays of one of the embodiments of the POWR method and system of the disclosure. FIGS. 14-30 show some of the options available in a POWR's main screen during each status phase of a POWR request. Virtually every screen used in the POWR system has a distinguishable format that may be recognizable as a POWR system element. FIGS, 17-23 show administrative screens that may be used to set up the POWR system for user accounts, work providers, charge numbers, charge approvers, and other data.

Figure 14:
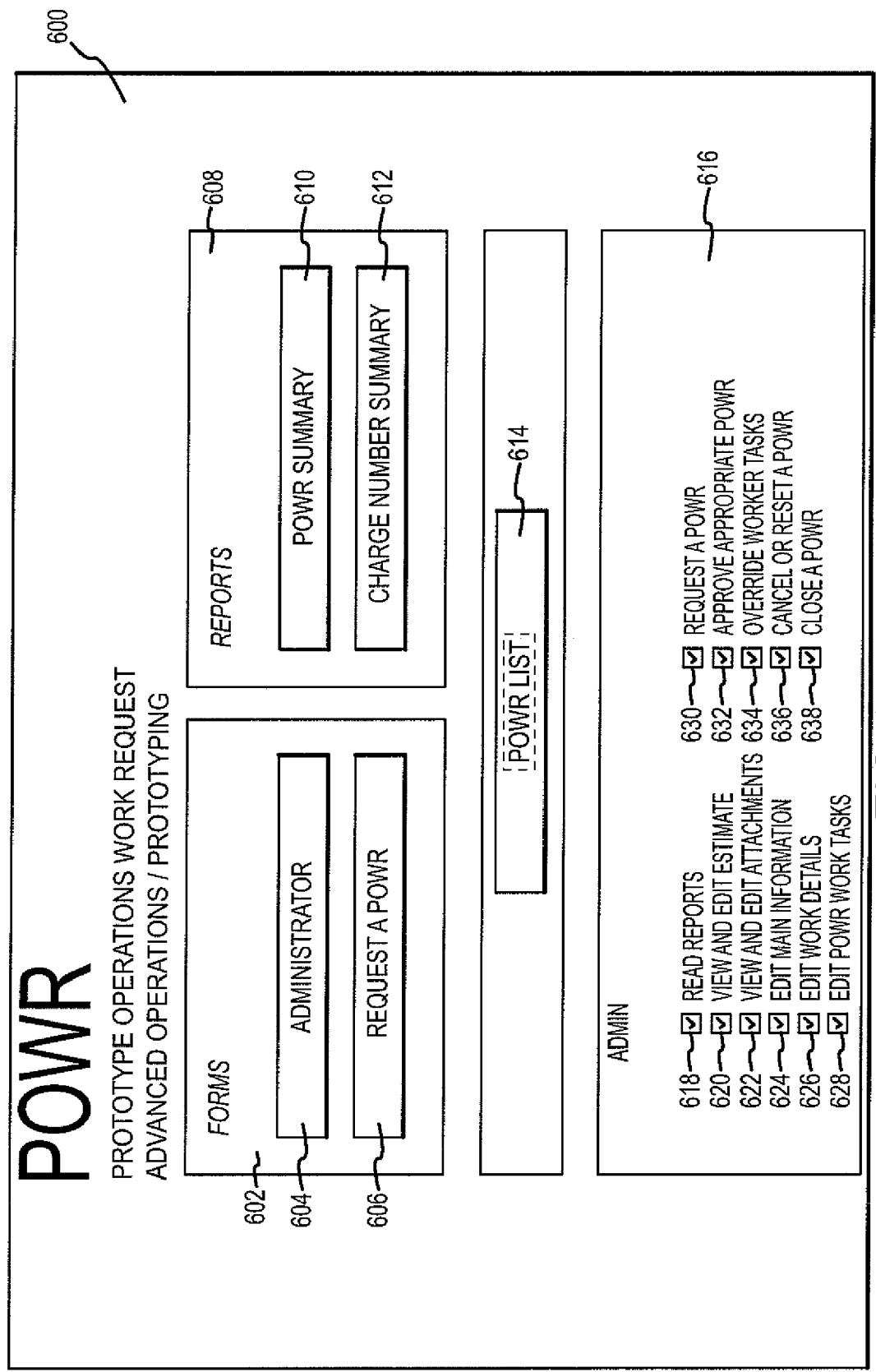
FIG. 14 is a first graphical user interface display of one of the embodiments of the POWR method and system of the disclosure.

FIG. 14 is a first graphical user interface display 600 showing the first display seen by an administrator or administrators upon opening POWR. This display is designed to be viewed by an administrator or administrators after logging into the POWR system. The administrator(s) may select a forms button 602 which includes an administrator button 604 and a request a POWR button 606. The administrator button 604 provides access to administrator forms and selections (see FIG. 17). The request a POWR button 606 provides access to POWR forms, opens a new POWR, and starts the POWR process, shown in FIGS. 24-28. The administrator(s) may select a reports button 608 which includes a POWR summary button 610 and a charge number summary button 612. The POWR summary button 610 opens the POWR summary report maker graphical user interface display 1030 (see FIG. 30). The charge number summary button 612 provides access to and produces a summary of charge number reports (see FIG. 30). The POWR system tracks the charge number associated with the POWR, and allows an administrator or user to modify and tailor the work request through the system. The administrator(s) may select a POWR list button 614 which opens a graphical user interface display 992 (see FIG. 29) that lists all POWR requests. The administrator(s) may select an admin button 616 that displays the user abilities within the POWR database as granted by the administrator. The user abilities may include a read reports button 618, a view and edit estimate button 620, a view and edit attachments button 622, an edit main information button 624, an edit work details button 626, an edit POWR work tasks button 628, a request a POWR button 630, an approve appropriate POWR button 632, an override worker tasks button 634, a cancel or reset a POWR button 636, a close a POWR button 638, or other suitable buttons for user abilities.

Figure 15:
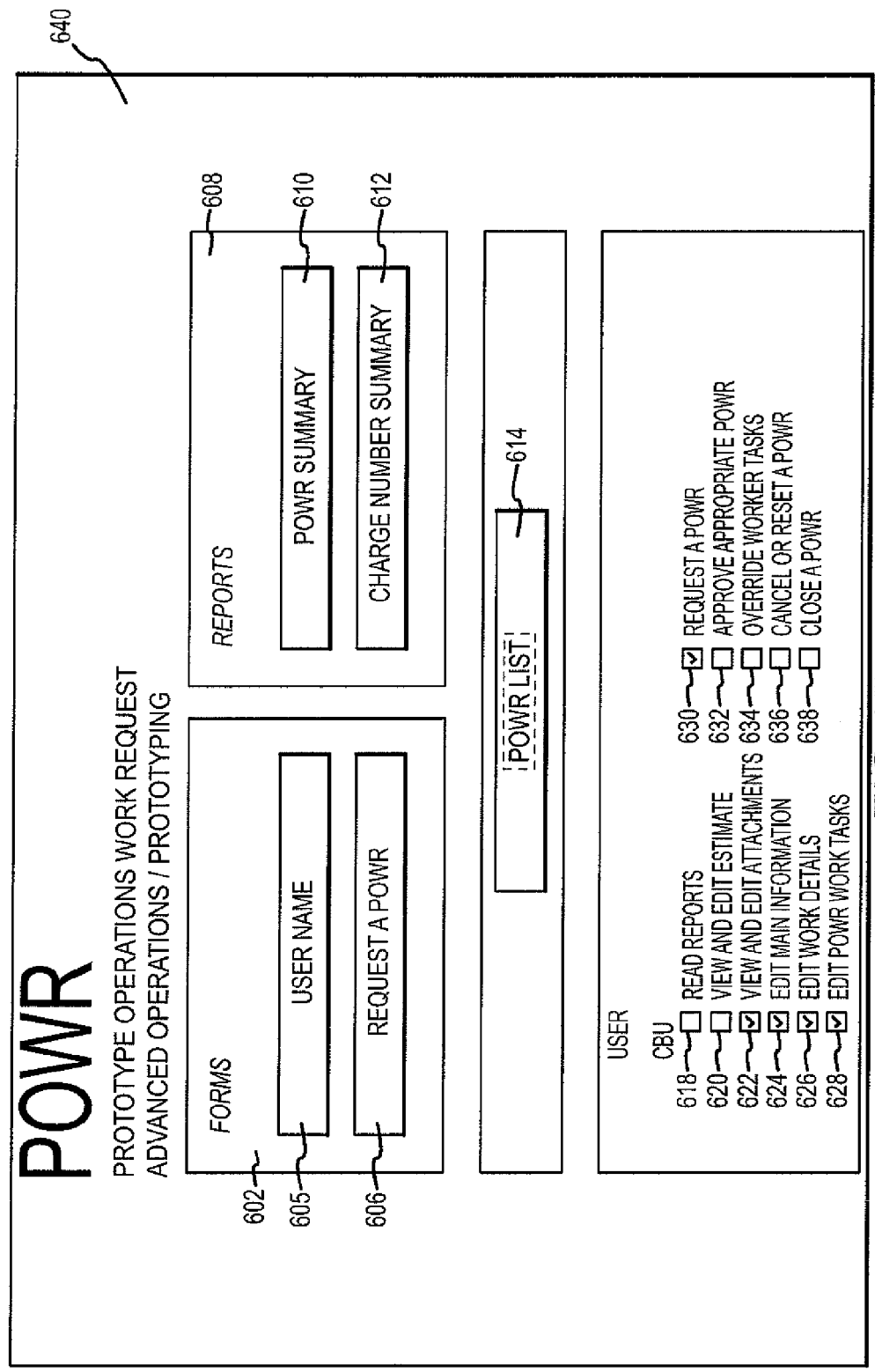
FIG. 15 is a second graphical user interface display of one of the embodiments of the POWR method and system of the disclosure.

FIG. 15 is a second graphical user interface display 640 that is designed to be viewed by a user, other than the administrator, after logging into the POWR system. Similar to the display 600 of FIG. 14, this display allows the user to select the forms button 602 which now includes a user name button 605 as well as the request a POWR button 606. The user name button 605 opens the user name graphical user interface display 644 (see FIG. 16). The request a POWR button 606 provides access to POWR forms, opens a new POWR, and starts the POWR process, shown in FIGS. 24-28. The user may select the reports button 608 which includes the POWR summary button 610 and the charge number summary button 612. The POWR summary button 610 opens the POWR summary report maker graphical user interface display 1030 (see FIG. 30). The charge number summary button 612 provides access to and produces a summary of charge number reports (see FIG. 30). The user may select the POWR list button 614 which opens the graphical user interface display 992 (see FIG. 29) that lists all POWR requests. The user may select a user button 642 that displays the user abilities within the POWR database as granted by the administrator. The user abilities may include the read reports button 618, the view and edit estimate button 620, the view and edit attachments button 622, the edit main information button 624, the edit work details button 626, the edit POWR work tasks button 628, the request a POWR button 630, the approve appropriate POWR button 632, the override worker tasks button 634, the cancel or reset a POWR button 636, the close a POWR button 638, or other suitable buttons for user abilities.

Figure 16:
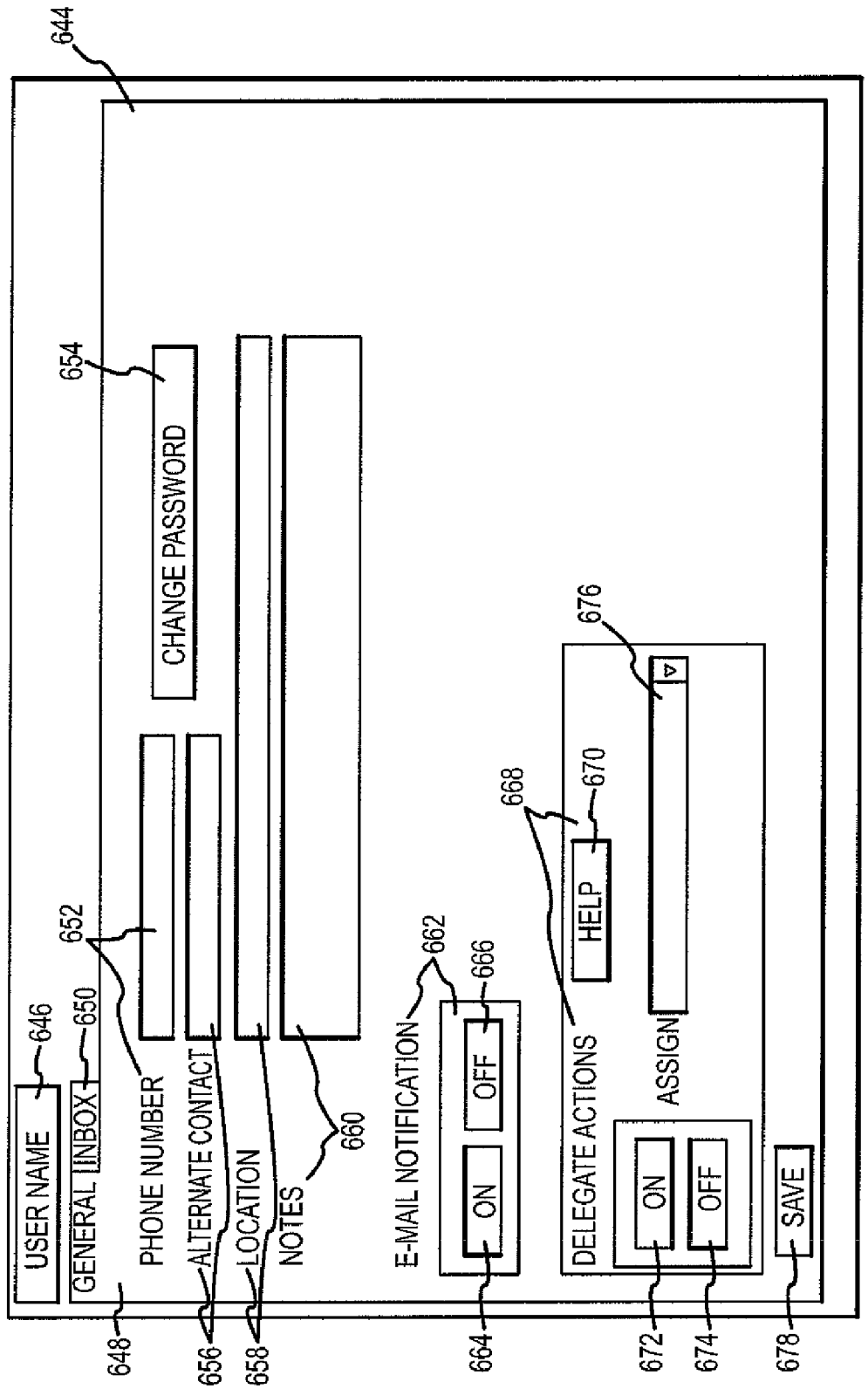
FIG. 16 is a third graphical user interface display of one of the embodiments of the POWR method and system of the disclosure.

FIG. 16 is a third graphical user interface display 644 showing a user name button 646. The display 644 can be viewed by the user after the user name button 605 is selected from the POWR system display 640 shown in FIG. 15. The display 644 includes a general tab 648 for inputting general information, including a phone number box 652, an alternate contact box 656, a location box 658, and a notes box 660. The display 644 further includes an inbox tab 650 for accessing and creating a personalized POWR list. The display 644 further includes a change password button 654, a help button 670, and a save button 678. The change password button 654 displays a change password display (not shown) that allows users to change their own password. The help button 670 opens a display (not shown) that explains the different parts of the user display 644 to the user. The save button 678 saves any changes the user makes to the database and display. The display 644 further includes an e-mail notification toggle button 662 having an on button 664 option and an off button 666 option. The e-mail notification toggle button 662 sets the preference for the user if the user would like to receive e-mail notifications. If not, the inbox 650 may be the only means of checking for POWR responsibilities. The display 644 further includes a delegate actions toggle button 668 having an on button 672 option and an off button 674 option. The delegate actions toggle button 668 sets the preference for the user to identify a delegate person to share the same responsibilities as the user in case the user is unavailable. An assign button pull down list 676 allows the user to choose from all users in the POWR system to identify as a delegate.

Figure 17:
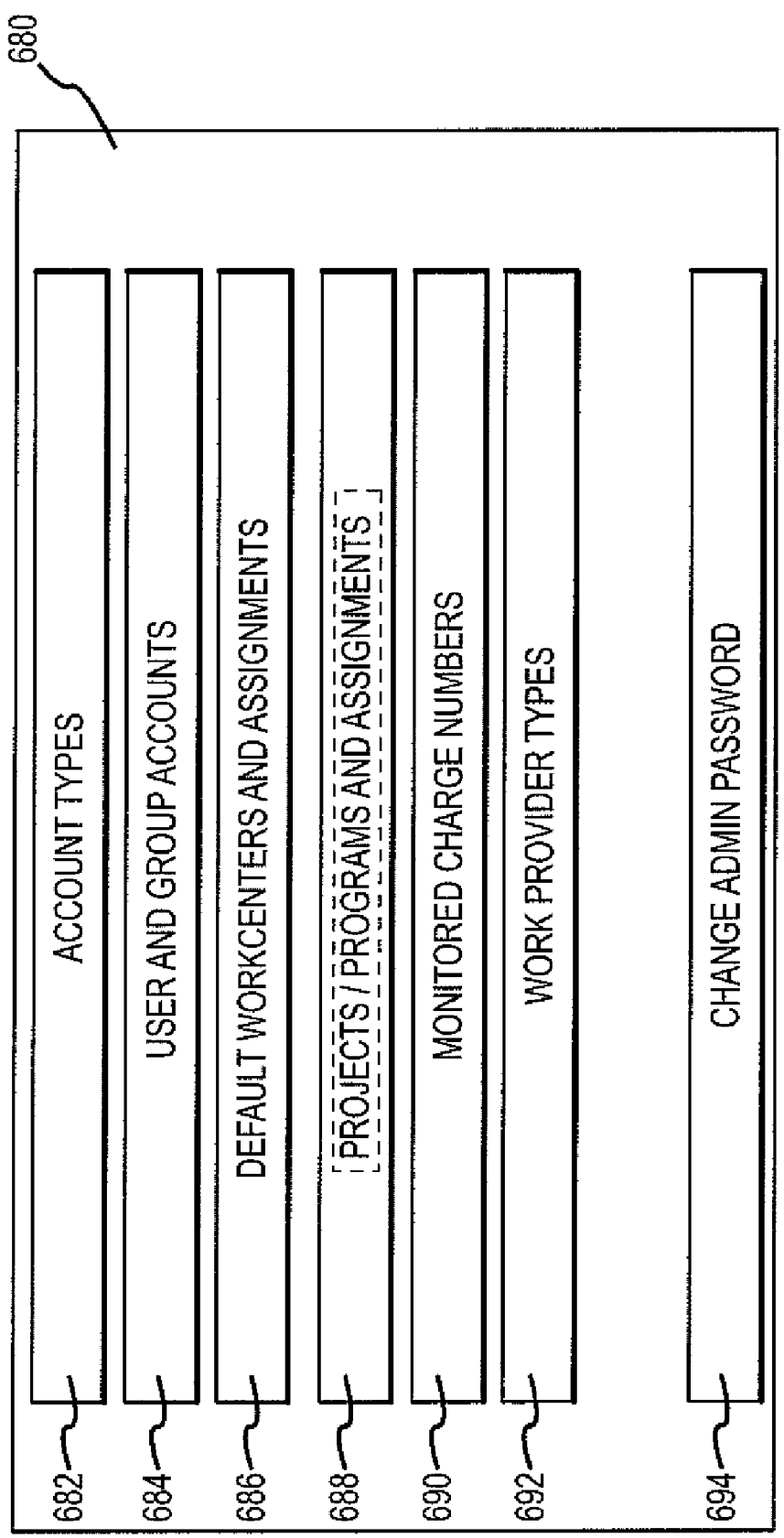
FIG. 17 is a fourth graphical user interface display of one of the embodiments of the POWR method and system of the disclosure.

FIG. 17 is a fourth graphical user interface display 680 that may be viewed by the administrator(s) after choosing the administrator button 604 on the POWR display 600 shown in FIG. 14. The display 680 includes an account types button 682, a user and group accounts button 684, a default workcenters and assignments button 686, a projects/programs and assignments button 688, a monitored charge numbers button 690, a work provider types button 692, and a change admin password button 694. The account types button 682 opens an account types display 696 shown in FIG. 18. The user and group accounts button 684 opens a user account display 740 shown in FIG. 19. The default workcenters and assignments button 686 opens a default workcenters and assignments display 772 shown in FIG. 20. The projects/programs and assignments 688 button opens a projects/programs and assignments display 790 shown in FIG. 21. The monitored charge numbers button 690 opens a monitored charge numbers display 810 shown in FIG. 22. The work provider types button 692 opens the work provider types display 820 shown in FIG. 23. The change admin password button 694 opens a change admin password display (not shown) allowing the administrator to change his or her password.

Figure 18:
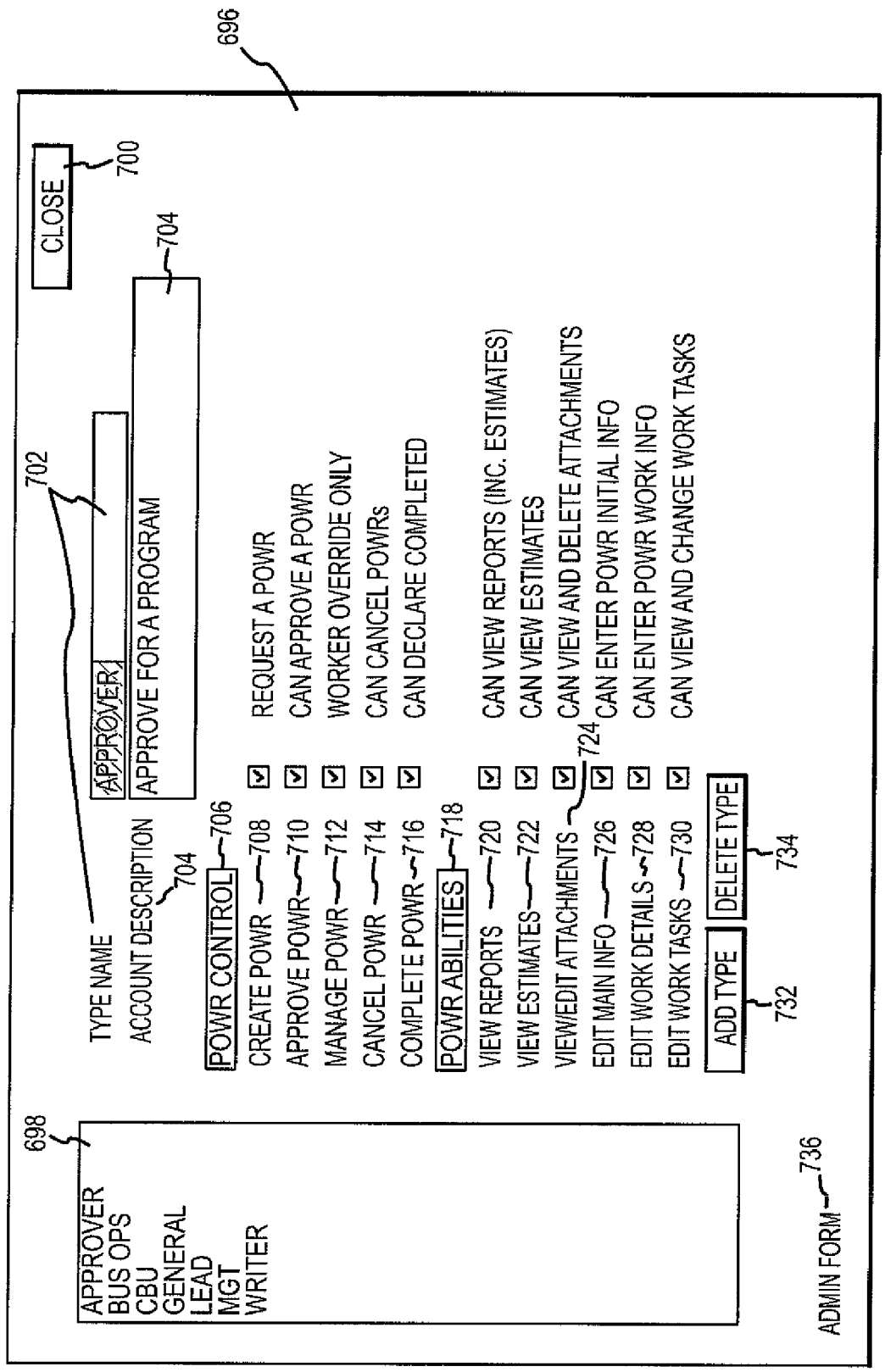
FIG. 18 is a fifth graphical user interface display of one of the embodiments of the POWR method and system of the disclosure.

FIG. 18 is a fifth graphical user interface display 696 for the account types display that can be used by the administrator(s) to add or edit account types and assign authorizations. The display includes a type of user list 698 which may include such user titles as "approver", "bus ops" (business operations), "CBU" (central business unit), "general", "lead", "mgt" (management) and "writer". The type of user is entered into the type name box 702, and an account description is entered into an account description box 704. The display further includes a close button 700 to close and exit the display 696. Each process in POWR may have a separate authorization. The administrator can create account types that can be assigned to users. Each account type preferably has a description and a list of POWR controls 706 and POWR abilities 718. The POWR controls 706 may include without limitation create POWR 708, approve POWR 710, manage POWR 712, cancel POWR 714, and complete POWR 716. The POWR abilities 718 may include without limitation view reports 720, view estimates 722, view/edit attachments 724, edit main info 726, edit work details 728, and edit work tasks 720. Because account types are designed by the administrator, the POWR system can be applied to any number of unique work areas. The display 696 further includes an add type button 732 to add an account type and a delete type button 734 to delete an account type. The display 696 further includes an admin form indicator 736.

Figure 20:
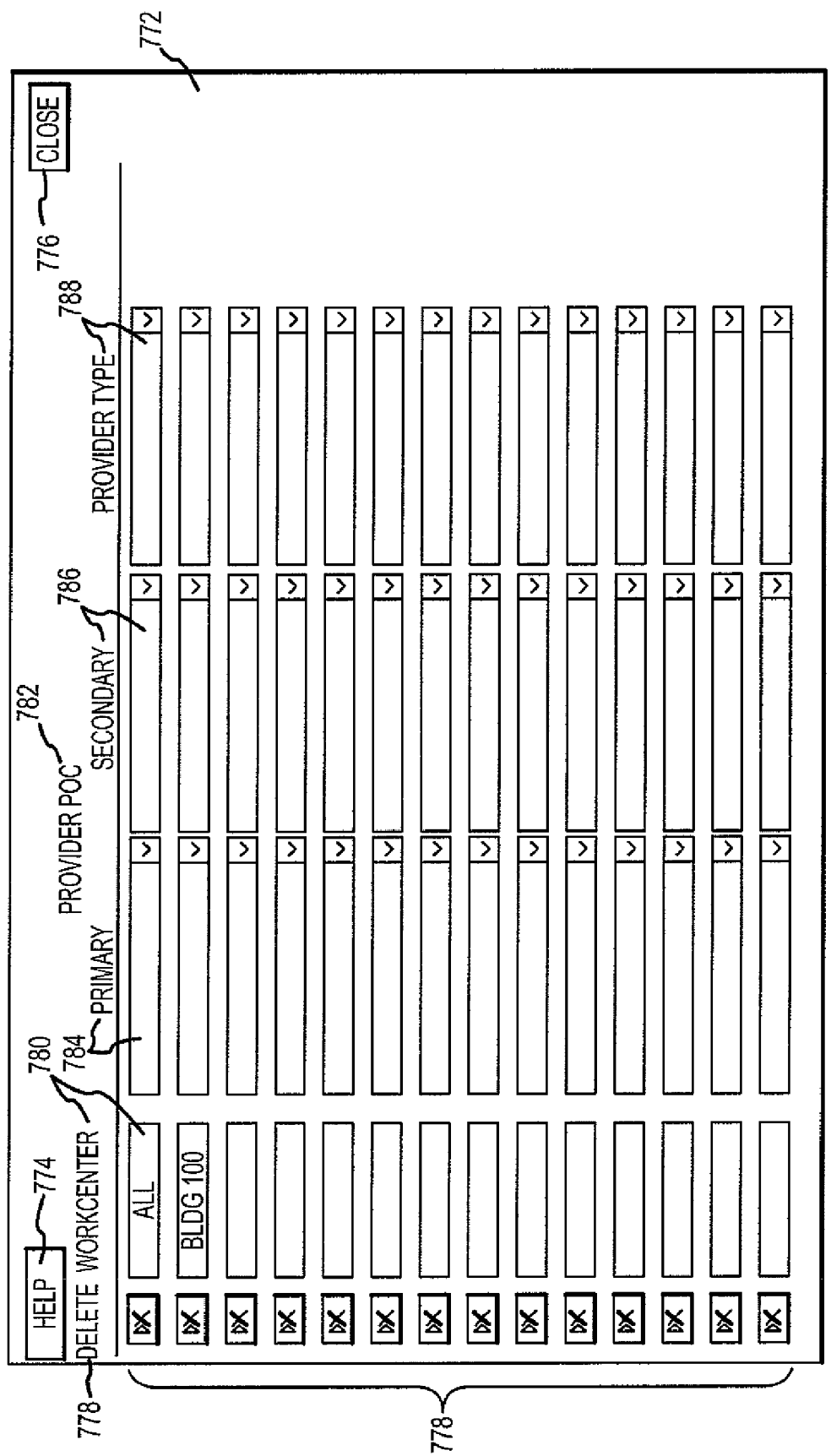
FIG. 20 is a seventh graphical user interface display of one of the embodiments of the POWR method and system of the disclosure.

FIG. 19 is a sixth graphical user interface display 740 for the user and group accounts display that can be used by the administrator(s) to control access to the POWR system, apply abilities via account types, set and retrieve passwords, add and remove accounts, and update e-mail information. An account report button 742 allows for a user account list report (not shown) to be created. A note 744 on the display indicates that, "Approvers must each have a unique user ID to be used for approval rights. Also, CBU workers will have their user ID recorded for signed off tasks and will have access based on their dept.". The display 740 further includes an account name box 746 for inputting the account name, a password box 748 for inputting a password, and a create account button 750 for creating the user and group accounts. The display 740 further includes account name designation boxes 752, edit buttons 754, password of POWR boxes 756, user type pull down list boxes 758 which can include such user titles as "approver", "bus ops" (business operations), "CBU" (central business unit), "general", "lead", "mgt" (management) and "writer", user name boxes 760, department number/names boxes 762 for inputting various department numbers/names, and e-mail address boxes 764 for inputting various e-mail addresses. The display further includes a close button 766 to close and exit the display 740, FIG. 20 is a seventh graphical user interface display 772 for the default workcenters and assignment display where workcenters or locations for work to be completed can be created. The default workcenters and assignments button 686 shown in FIG. 17 opens a default workcenters and assignments display 772 shown in FIG. 20. The display includes a help button 774 to remind the administrator(s) of the purpose of the display. The display further includes a close button 776 to close and exit the display 772. The display further includes delete buttons 778, workcenter buttons 780 for indicating the workcenter location, provider POC (point of contact) indicator 782 which includes primary provider drop down list boxes 784 and secondary provider drop down list boxes 786, and provider type drop down list boxes 788. Various primary and secondary providers or managers of work, as well as provider types, are identified via drop down lists. This display assists in limiting the work completed at each location according to work that can be completed there. This display can also be used in the POWR process and system to identify work managers through e-mail and inbox notification.

Figure 21:
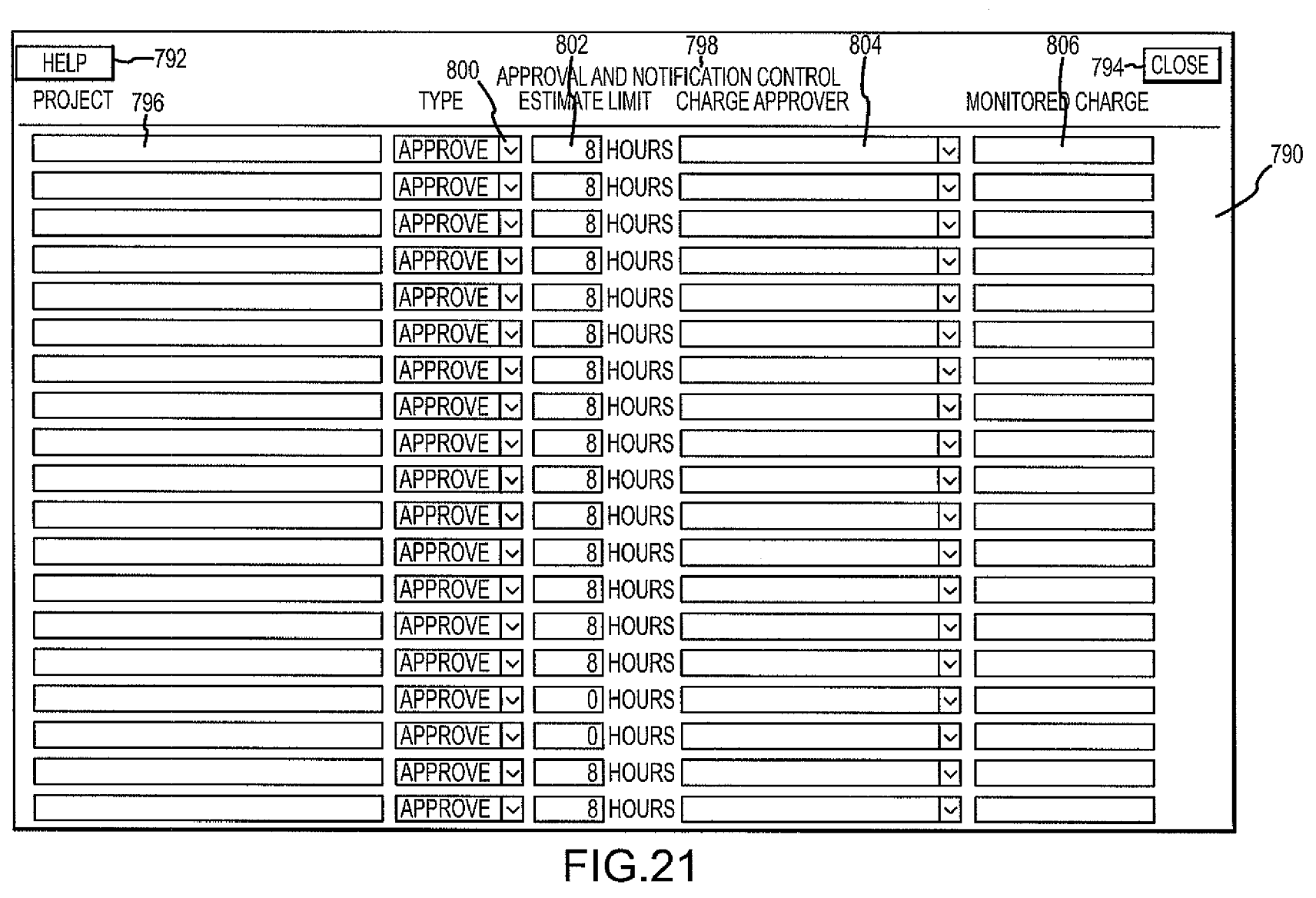

FIG. 21 is an eighth graphical user interface display 790 for projects/programs and assignments display that can be used by the administrator(s) to link projects/programs with an approval type, charge threshold, and approver. The display includes a help button 792 to remind the administrator(s) of the purpose of the display. The display further includes a close button 794 to close and exit the display 790. The display 790 further includes project boxes 796, an approval and notification control indicator 798, approval type drop down list boxes 800, estimate time limit boxes 802, charger approver drop down list boxes 804, and monitored charge boxes 806. The approval types that can be displayed in the approval type drop down lists may include without limitation "approve", "notify" (not shown), and "N/A" (not applicable) (not shown). When writing a POWR, the writer chooses a project the request is for, or creates a new one. If the project is identified in this list, it retrieves the approval type. If the approval type is "approve", it means the default authority is to have the approver identify and approve unless the charge is below the charge threshold identified. If the approval type is "notify", the approver is notified no matter what the charge. If the approval type is "N/A", no approver is notified and a general approval account can approve the charge. The approver is chosen via a drop down list from a filtered list of users that have the approve authority.

Figure 22:
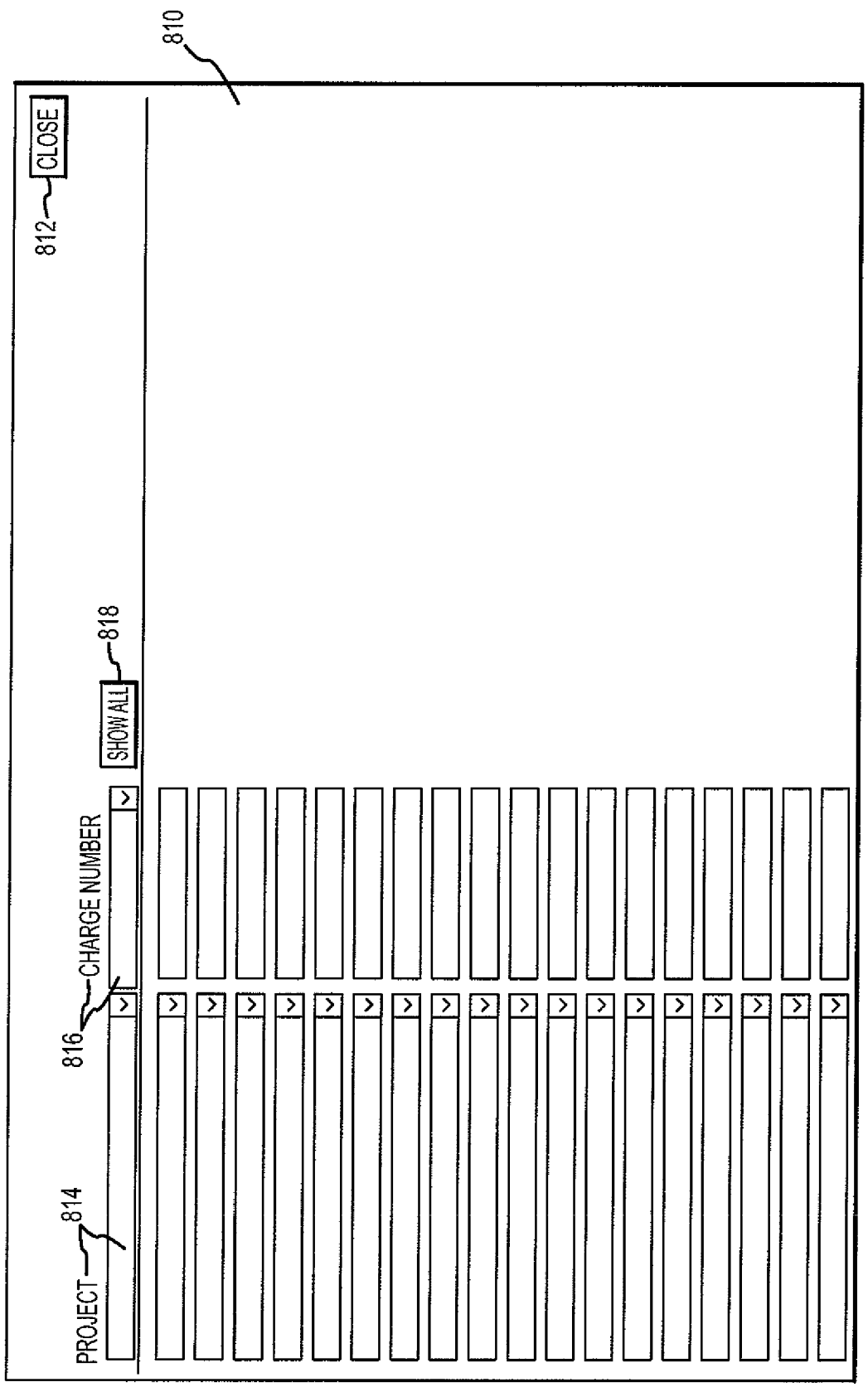
FIG. 22 is a ninth graphical user interface display of one of the embodiments of the POWR method and system of the disclosure.

FIG. 22 is a ninth graphical user interface display 810 for monitoring charge numbers that can be used by the administrator(s) to link a project with one or more charge numbers. Therefore, if a charge number is used in this display and exists in this display, the POWR system can identify what project/approver/workers it is used for. This keeps quality control over charge numbers that are strictly monitored. The display 810 includes a close button 812 to close and exit the display 810. The display 810 further includes project drop down list boxes 814, charge number drop down list boxes 816 and a show all button 818. The project name and charge number boxes act as a filter for fast access to the desired information. The show all button allows the administrator(s) to see all entries after the project name and charge number filter has been used.

Figure 23:
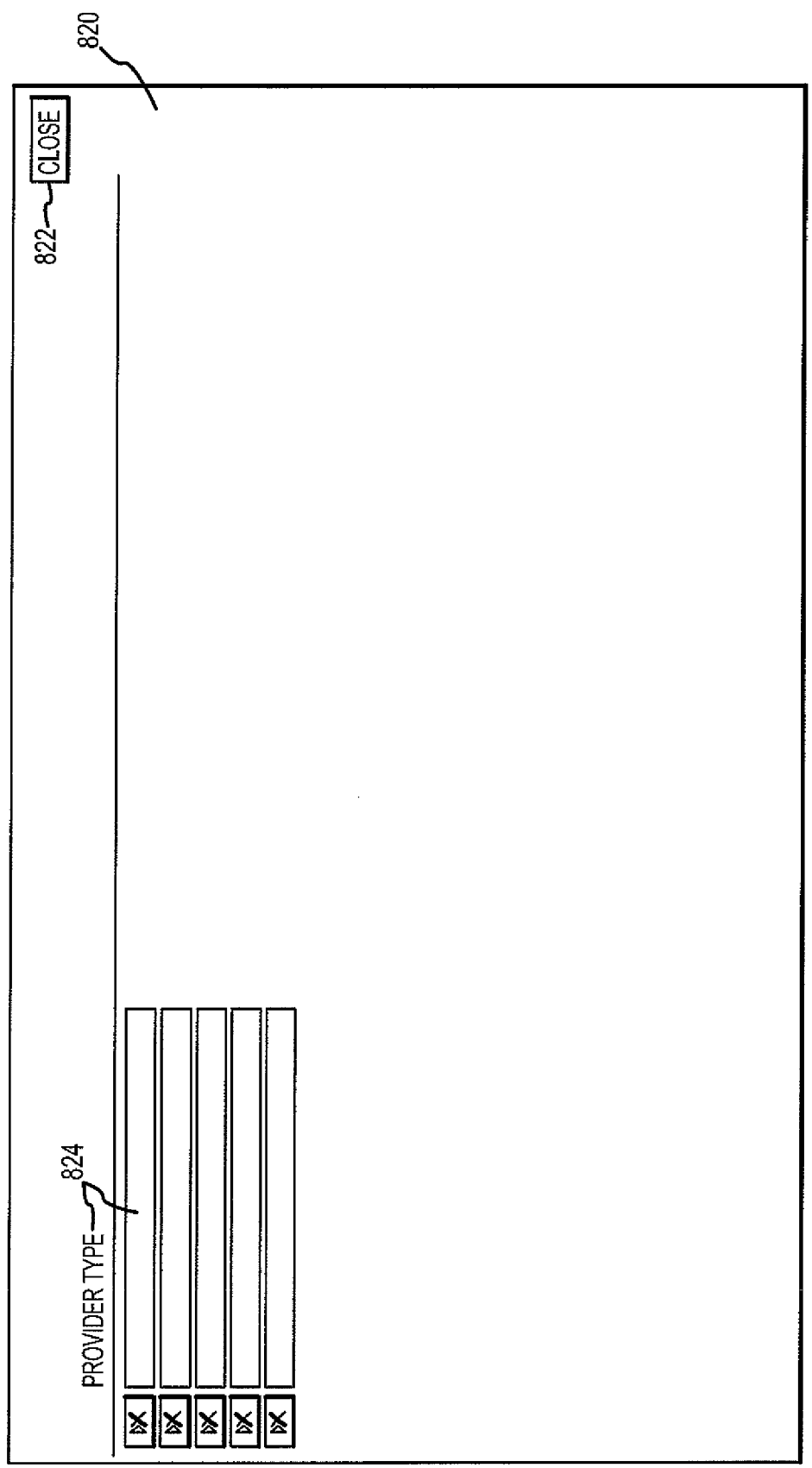
FIG. 23 is a tenth graphical user interface display of one of the embodiments of the POWR method and system of the disclosure.

FIG. 23 is a tenth graphical user interface display 820 for work provider types display that can be used by the administrator(s) to add or remove the work provider types. The display 820 includes a close button 822 to close and exit the display 820. The display 820 further includes provider type boxes 824 for adding or removing the work provider types.

FIG. 24 is an eleventh graphical user interface display 830 of the main POWR display or form for inputting the work request data and instructions with a main tab 840 open. The display 830 may be viewed by all users who select to view a POWR or request a POWR. The display 830 includes a refresh button 832 to refresh the display 830 and a close button 834 to close and exit the display 830, a POWR# (number) indicator 836, and a status indicator 838 which in FIG. 24 shows, for example, the status as "opened". The display 830 further includes five tabs including the main tab 840, an attachments tab 842, a materials tab 844, a work tab 846, and a summary tab 848. Display 830 shows the main tab 840 open. The main tab 840 may include without limitation information fields such as a title/description box 850, a project/program drop down list box 852, a work provider type drop down list box 854, a work provider location drop down list box 856, a work provider POC (point of contact) box 858, an associated reference number drop down list box 862, a required field indicator 864 that indicates the required fields with an "*" symbol, a background/supporting info (information) box 866, an overhead approver box 868, a process required: charge without approval indicator 870, an hours box 872, a charge number drop down list box 876, a deliver competed item(s) to box 878, a task manhours indicator 880 having an add estimate button 882 and a view history 884 button and a view box 885. The add estimate button 882 opens a display (not shown) for adding an hour estimate with a field for estimate information. When saved, the date, estimator, estimate, and estimate information are saved into an estimate history (view history). The view (estimate) history button displays the estimate history for the given POWR as well as the current estimate. The required fields include project/program 852, work provider type 854, work provider location 856, requesting POC 860, and charge number 876. Drop down fields are linked when choices are made. Drop down fields include project/program 852, work provider type 854, work provider location 856, associated reference number 862, and charge number 876. The title/description box 850 is preferably used for identification labeling purposes only. The project/program box 852 allows a user to pick from an existing project/program identified in the program/project and assignments display 790 (see FIG. 21) by the administrator. The work provider type drop down list box 854 is filled with work provider types 824 identified in the display 820 (see FIG. 23). The work provider location drop down box 856 is filled with workcenters 780 identified in the workcenter assignments display 772 (see FIG. 20). The work provider POC box 858 is automatically filled out once the work provider location and work provider type fields are selected. The requesting POC box 860 is a field that is used to store a requestor name for the work to be done. The associated reference number box 862 allows users to associate one or multiple POWR requests with one reference number. If a reference number has previously been entered, it will reside in a drop down list for this field. If not, the field can be typed in for future use. The background/supporting info box 866 is used for generic information to be typed into the box. The overhead approver box 868 will automatically be filled in depending on the project/program, charge number, and charge threshold of the POWR. The approval process type displays the process type used depending on POWR project/program, charge number, and charge threshold. The hours box 872 displays the threshold hours identified by the project in the project/programs and assignments display 790 (FIG. 21) by the administrator. The charge number box 876 allows a user to type in a new charge number or select from a list of previously used charge numbers. Once entered the POWR system will use the monitored charge numbers set up by the administrator to determine what type of approval is needed, and identify a project that is monitoring the charge number.

The deliver completed item(s) to box 878 displays general delivery information. The display 830 further includes seven main buttons comprising a request button 886, an approve POWR button 888, a decline POWR button 890, a cancel POWR button 892, a work POWR button 894, a POWR completed button 896, and a reset button 898. The tabs 840, 842, 844, 846, and 848 and the main buttons 886, 888, 890, 892, 894, 896 and 898 are visible when any of the five tabs are selected. The main buttons control the POWR process from one status to another. The request button 886 begins the in-review status process shown in FIG. 8. The approve button 888 begins the approved status process shown in FIG. 9. The decline POWR button 890 ends the POWR process with the closed status process shown in FIG. 13. The cancel POWR button 892 begins the cancelled status process shown in FIG. 12. The work POWR button 894 begins the in-work status process shown in FIG. 10. The POWR completed button 896 ends the POWR process with the closed status process shown in FIG. 13.

Figure 25:
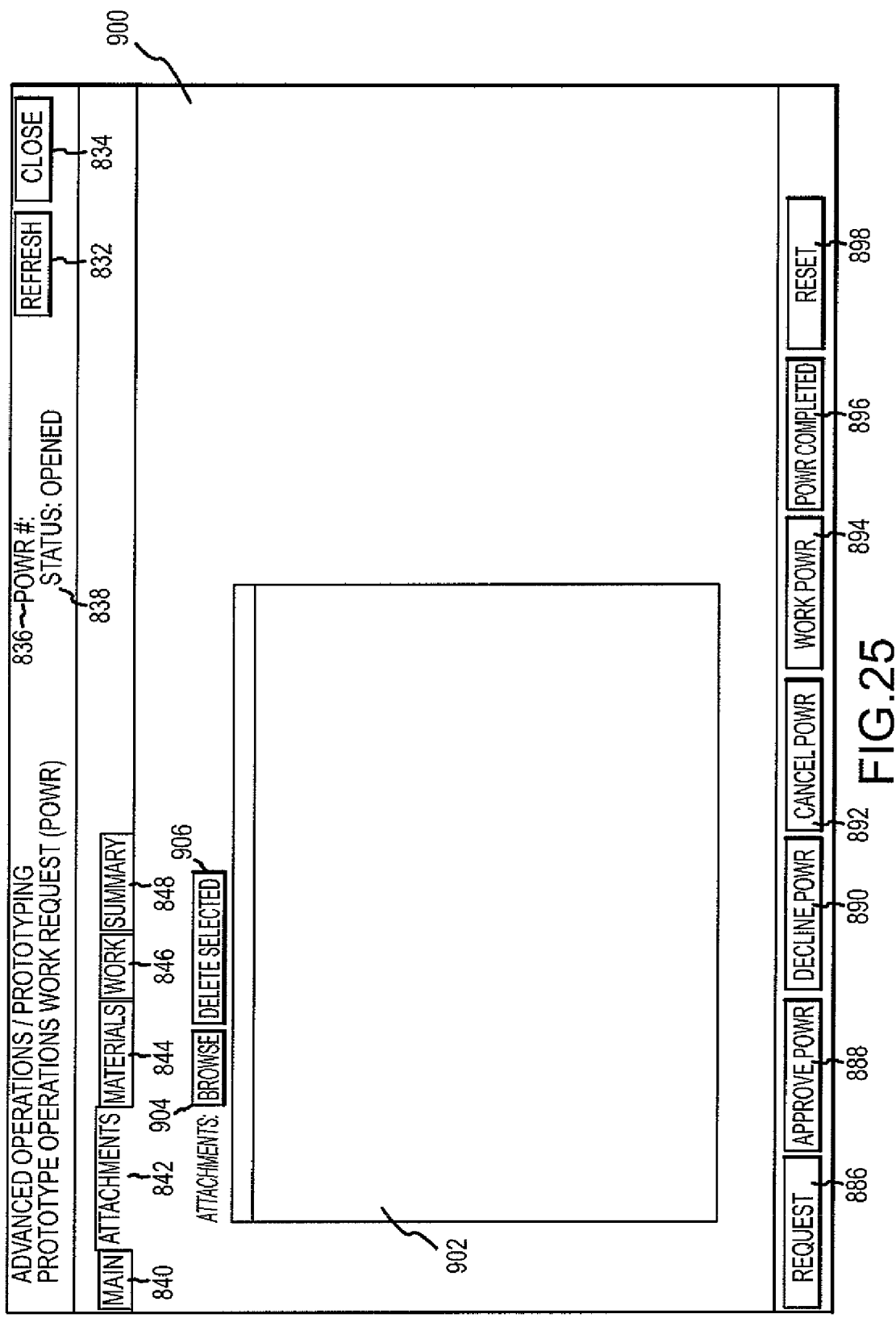
FIG. 25 is a twelfth graphical user interface display of one of the embodiments of the POWR method and system of the disclosure.

FIG. 25 is a twelfth graphical user interface display 900 showing the main POWR display or form for reviewing attachments with the attachments tab 842 open. Similar to the display 830 of FIG. 24, the display 900 includes the refresh button 832 to refresh the display 900 and the close button 834 to close and exit the display 900, the POWR# (number) indicator 836, and the status indicator 838 which in FIG. 25 shows, for example, the status as "opened". The display 900 further includes the five tabs including the main tab 840, the attachments tab 842, the materials tab 844, the work tab 846, and the summary tab 848. The attachments tab 842 shows an attachments list box 902, a browse button 904, and a delete selected button 906. The browse button 904 may open a Windows display (not shown) that allows a user to add attachments to a POWR. Any computer file may be used as an attachment, for example, PowerPoint (not shown), Unigraphics (not shown), or other suitable computer files. Once selected the file is copied to the POWR server 302 (FIG. 4) and stored in attachment storage 308 (FIG. 4) for that specific POWR. Attachments may be directed at certain work tasks in a work request. The delete selected button 906 deletes the file(s) selected in the attachments list box 902 from the POWR server. The attachments list box 902 is designed to show a list of the files saved on the POWR server for that particular POWR. When double clicked, the files will open using their associated program. Saving attachments to the POWR server allows for files to be backed up and also keeps the files from being modified. The display 900 further includes the seven main buttons comprising the request button 886, the approve POWR button 888, the decline POWR button 890, the cancel POWR button 892, the work POWR button 894, the POWR completed button 896, and the reset button 898 as discussed above in connection with FIG. 24.

Figure 26:
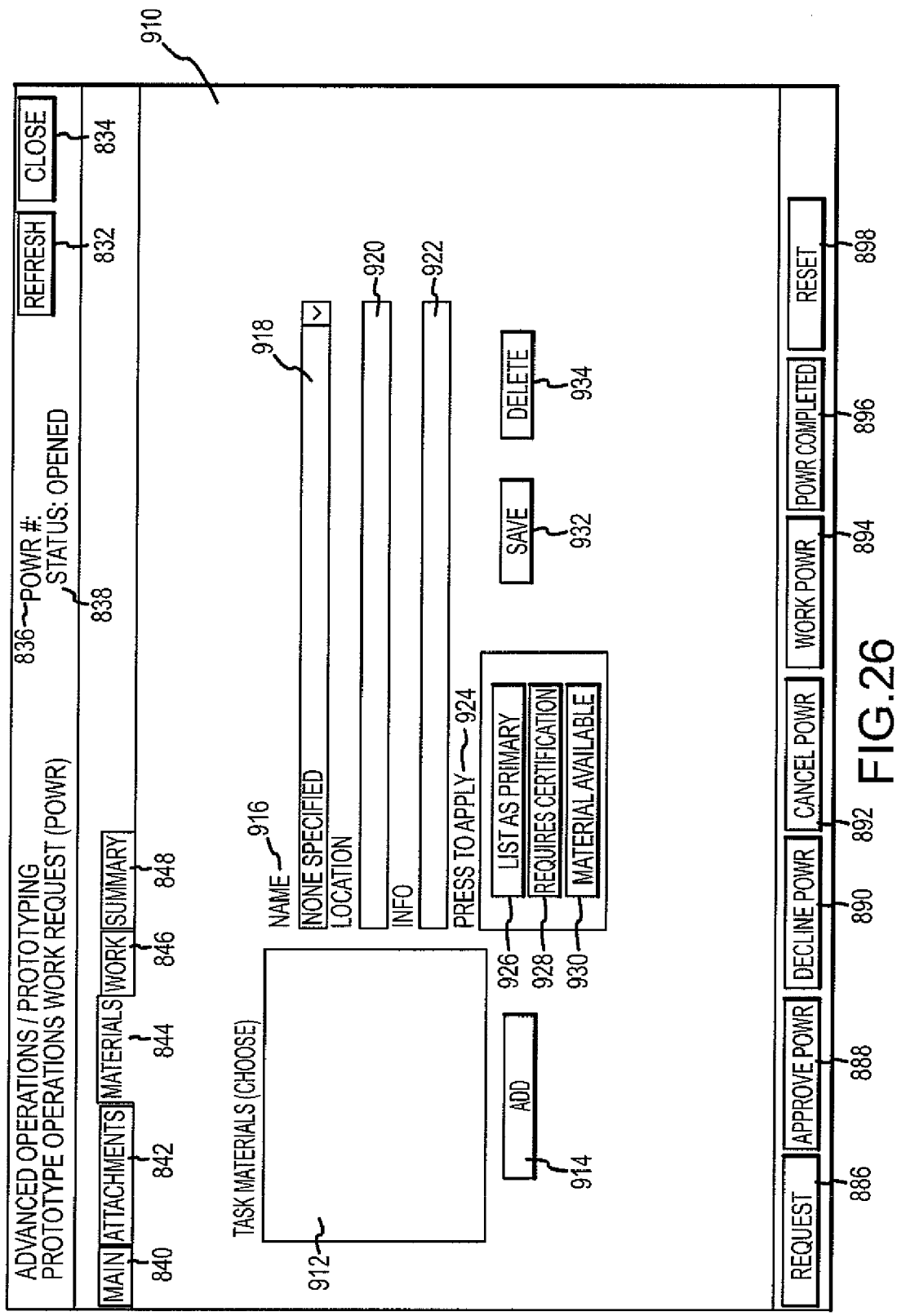
FIG. 26 is a thirteenth graphical user interface display of one of the embodiments of the POWR method and system of the disclosure.

FIG. 26 is a thirteenth graphical user interface display 910 showing the main POWR display or form for creating a materials list for a POWR with the materials tab 844 open. Materials may be identified in POWR tasks to be used. Similar to the display 830 of FIG. 24, the display 910 includes the refresh button 832 to refresh the display 910 and the close button 834 to close and exit the display 910, the POWR# (number) indicator 836, and the status indicator 838 which in FIG. 26 shows, for example, the status as "opened". The display 910 further includes the five tabs including the main tab 840, the attachments tab 842, the materials tab 844, the work tab 846, and the summary tab 848. The materials tab 844 includes a task materials (choose) box 912, an add button 914, a name indicator 916, a name drop down box 918, a location box 920, and an info (information) box 922. The add button 914 adds a record to the database for an added material. In addition, the display 910 includes a press to apply indicator 924 with three options including a list as primary button 926, a requires certification button 928, and a material available button 930. These options may identify what materials can be used in a specific task. The display 910 further includes a save button 932 and a delete button 934. The save button 932 saves any changes to the POWR database. The delete button 934 deletes the task materials highlighted in the task materials list box 912 from the POWR server 302 (see FIG. 4). The display 910 further includes the seven main buttons comprising the request button 886, the approve POWR button 888, the decline POWR button 890, the cancel POWR button 892, the work POWR button 894, the POWR completed button 896, and the reset button 898 as discussed above.

Figure 27:
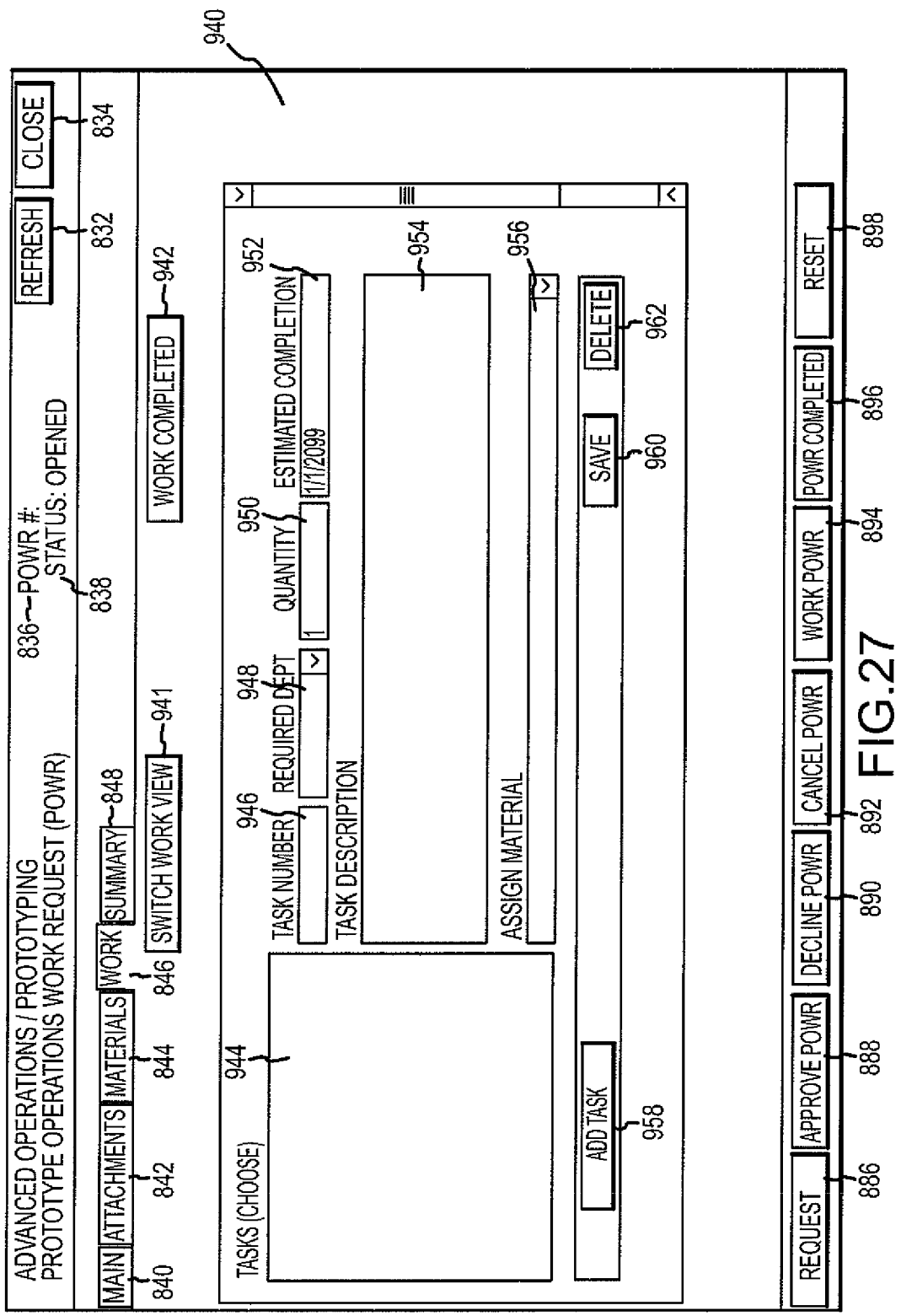
FIG. 27 is a fourteenth graphical user interface display of one of the embodiments of the POWR method and system of the disclosure.

FIG. 27 is a fourteenth graphical user interface display 940 showing the main POWR display or form for work task information with the works tab 846 open. Work tasks may be input and identified in display 940. A user can view the display as a list instead of fields to change. The user can also view an additional button (not shown) for signing a task. Similar to the display 830 of FIG. 24, the display 940 includes the refresh button 832 to refresh the display 940 and the close button 834 to close and exit the display 940, the POWR# (number) indicator 836, and the status indicator 838 which in FIG. 27 shows, for example, the status as "opened". The display 940 further includes the five tabs including the main tab 840, the attachments tab 842, the materials tab 844, the work tab 846, and the summary tab 848. The display 940 includes a switch work view button 941 and a work completed button 942. The display 940 further includes a task (choose) box 944, a task number box 946, a required dept. (department) drop down list box 948, a quantity box 950, an estimated completion (date) box 952, a task description box 954, and an assign material box 956. The task number box 944 indicates the task order shown to workers. The required department box 948 is used to limit which workers can sign off on a task. This is associated with the department field used by the administrator in the user account form. The quantity box 950 identifies how many times the task should be done. The estimated completion box 952 allows a POWR work manager or user a field to fill in a goal date to have the task completed by. The task description box 954 is a field for the actual task or a referral to an attachment. The assign material drop down list box allows for the choice of an entered material from the materials tab 844. The display 940 further includes an add task button 958, a save button 960 and a delete button 962. The add task button 958 adds a record for the task associated with the open POWR. The save button 960 saves any changes to the POWR database. The delete button 962 deletes the selected or current record in the tasks list box 943 from the POWR server 302 (see FIG. 4). The display 940 further includes the seven main buttons comprising the request button 886, the approve POWR button 888, the decline POWR button 890, the cancel POWR button 892, the work POWR button 894, the POWR completed button 896, and the reset button 898 as discussed above.

FIG. 28 is a fifteenth graphical user interface display 964 showing the main POWR display or form for summary of the request with the summary tab 848 open. Similar to the display 830 of FIG. 24, the display 964 includes the refresh button 832 to refresh the display 964 and the close button 834 to close and exit the display 964, the POWR# (number) indicator 836, and the status indicator 838 which in FIG. 28 shows, for example, the status as "opened". The display 964 further includes the five tabs including the main tab 840, the attachments tab 842, the materials tab 844, the work tab 846, and the summary tab 848. The display 964 includes a requested by box 966, an approved by box 968, a start work by box 970, a POWR closed by box 972, a requested on (date) box 974, an approved on (date) box 976, a start work on (date) box 978, and a POWR closed on (date) box 980. The display 964 further includes an update estimate button 982, a POWR notes box 984 with a maximum of 255 characters, a preview current POWR button 986, a preview headers button 988, and a bar code help button 990. The POWR notes box 984 is designed for inputting any general background information relating to the POWR. The update estimate button 982 is the same as the add estimate button 882 of the main tab 840 display 830. This button allows certain users to update the estimate as a POWR is progressing for actual hours. If a POWR exceeds its approval threshold and the approval type is "approve" then the POWR automatically gets reset to opened status. This forces the user or writer to quickly get approval before any additional work is completed. The preview current POWR button 986 creates a report (not shown) for the current POWR, so it can be printed out. The preview headers button 988 opens to a special report (not shown) designed for certain system users. The bar code help button 990 explains how to install bar code fonts for use with the header special report. The display 964 further includes the seven main buttons comprising the request button 886, the approve POWR button 888, the decline POWR button 890, the cancel POWR button 892, the work POWR button 894, the POWR completed button 896, and the reset button 898 as discussed above.

FIG. 29 is a sixteenth graphical user interface display 992 showing a POWR request list 996. FIG. 29 shows the POWR request list opened from the POWR list 614 of display 600 (see FIG. 14). The POWR request list 996 includes the fields of action 998, view boxes 1000, number of request 1002, status of request 1004, date requested 1006, project/program 1008, provider 1010, and title/description 1012. The display 992 further includes a close button 994 to close and exit the display 992. The display 992 shows a list of POWR requests and may be sorted using any fields existing in POWR records with a field drop down box 1014 and a value box 1016 and an associated find button 1018 and a reset button 1020. In addition, the display 992 includes an open button 1022, a closed button 1024, and an all button 1026 that allow a user to sort by open records, closed records, and all records.

FIG. 30 is a seventeenth graphical user interface display 1030 for a POWR report maker 1034 or generator. FIG. 30 shows the POWR report maker 1034 form as opened from the POWR summary button 610 from display 600 (see FIG. 14). The display 1030 includes a field drop down list box 1036, a value drop down list box 1038, filters 1040, an add button 1042, a listed report button 1044, a grouped report button 1046, a remove button 1048, a clear all button 1050, and a note:year format is 20## indicator 1052. The POWR report maker allows a user to make a list of fields with a sorting value and then provide customized service reports (see step 212 of FIG. 3) in a listed format or grouped format. The service reports, which may be filtered, may comprise various reports, including but not limited to, reports based on charge numbers, points of contact, requesters, dates of request, estimated man hours, requesting departments, item descriptions, quantity of requested items and/or other fields in the database. Service reports generated over a specific range of dates may be viewed and printed. In addition, service reports may be generated that display not only the estimated labor hours required to provide a service or item, but also provide the actual hours expended in satisfying the work request or a series of requests based on a particular charge number, requesting department, program, point of contact, or other criterion listed on the work request. Labor reporting and charging errors can be avoided by providing an electronic charge number recording capability that associates each request with the appropriate charge number for the hardware or service requested.

The POWR method and system provide for a work request document that includes all information necessary to provide service and monitor the progress of the work request, in real-time, from the time the request is initiated through job completion and close out. With the method and system disclosed herein, workload visibility, workload forecasting, creation of daily work assignments and level-loading of the prototype operations facilities can be improved. Real-time status of the work request may be available to the networked participants, and control and management of the overhead relating to the work request can be improved. With this method and system, expedited material delivery fees can be avoided and fewer delays associated with out of stock materials can also be avoided. The system and method offer users the option of documenting work requests in high level abbreviated format, detailed format tailored to the complexities of the work requested, or another suitable format. Work request tailoring based on product or service complexity eliminates unnecessary documentation for simple tasks, and, at the same time, offers economical documentation consistent with complex tasks definition. This flexibility is of particular value in instances where the cost incurred in performing the task is very limited as compared with costs required to document the request using existing alternatives. The method and system of the disclosure allow for electronic work request creation (work request documentation), including the attachment of relevant electronic files, and allow role based access for users to review, approve/disapprove, modify, cancel, delete, verify completion status, sign-off task completions, sign-off work order completions and run reports based on optional data filters, and provide for economical documentation of work requests. The method and system of the disclosure have applications for service providers, manufacturers, suppliers, customers, and other interested parties in various industries, including the airline and aerospace industry. In addition, the method and system of the disclosure have applications for organizations where one of a kind requests for services are common, i.e. facilities services (maintenance requests), requests for quality's NDI (non-destructive inspection), or where tradesmen and/or technicians respond to service requests from multiple internal customers located in various locations.

As discussed above, the work request may include without limitation data and information such as title of the request, description of the work requested, project, program, work provider type, work provider location, work provider point of contact, requesting point of contact, associated reference number, background information for work requested, supporting information for work requested, overhead approver, hours for work request, charge number, estimated hours to complete work requested, task materials needed for the work requested, location of materials, material certification, work tasks, task number, requester department, quantity of requested materials, estimated completion date, task description, assign material, identification of requester, date of work request, identification of approver, date of approval of work request, date work started on work request, date work request closed, identification of closer of work request, delivery contact, reference numbers to interface with other systems, work instructions including sign-off authorization, and nomenclature of requested hardware or service and references. As discussed above, the electronic notifications relating to the work request instructions may include without limitation approval authority, authority to proceed, approval of the work request, revisions to the work request, updates to the work request, instructions for building, cancellation of the work request, completion of the work request, changes in quantity of items requested, and revised estimated hours to complete the request.

Implementation of one of the embodiments of the POWR method and system over a 5-month period of time resulted in a significant (32%) productivity gain for those prototype service providers supporting prototype production operations. Such a gain may be largely attributed to the improved ability to manage the workload, monitor the tasks' performance, and provide improved customer service.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An automated method to be performed in a computing environment for processing a work request, the method comprising the steps of:
   receiving the work request;
   inputting the work request into an electronic database;
   tailoring the work request, by a user, based on complexity of a product or a service;
   creating automated electronic work request instructions that incorporate an approval/disapproval feature based on estimated hours for the work request and a charge estimate threshold for the work request, the charge estimate threshold set by one with approval authority prior to creation of the work request;
   approving or disapproving the work request based on previously set approval authority within the approval/disapproval feature prior to incurring any costs, wherein if an approval type is "approve", a default authority allows an approver to identify and approve unless a charge is below the charge estimate threshold, wherein if the approval type is "notify", the approver is notified no matter what the charge, and wherein if the approval type is "N/A" (not applicable), no approver is notified and a general approval account can approve the charge;
   linking the electronic work request instructions to multiple networked computers; and,
   transmitting between the networked computers electronic notifications relating to the work request instructions.

2. The method of claim 1 wherein the work request is a prototype operations work request (POWR) selected from the group comprising a service request, a hardware request, a manufacturing request, build instructions, general labor activities, archived records of requests, or a combination thereof.

3. The method of claim 1 wherein the electronic database comprises a shared server having a front-end database, a back-end database, and an attachment storage device.

4. The method of claim 1 wherein the step of creating electronic work request instructions further comprises creating a sequenced series of tasks to be worked sequentially for accomplishing the work request.

5. The method of claim 1 wherein the work request comprises data selected from the group comprising title of the request, description of the work requested, project, program, work provider type, work provider location, work provider point of contact, requesting point of contact, associated reference number, background information for work requested, supporting information for work requested, overhead approver, hours for work request, charge number, estimated hours to complete work requested, task materials needed for the work requested, location of materials, material certification, work tasks, task number, requester department, quantity of requested materials, estimated completion date, task description, assign material, identification of requester, date of work request, identification of approver, date of approval of work request, date work started on work request, date work request closed, identification of closer of work request, delivery contact, reference numbers to interface with other systems, work instructions including sign-off authorization, and nomenclature of requested hardware or service and references.

6. The method of claim 1 further comprising the step of inputting and storing into the electronic database one or more attachments to the work request, wherein the attachments are created by computer software.

7. The method of claim 1 wherein the multiple networked computers are personal computers.

8. The method of claim 1 further comprising providing automated service reports filtered on specific data of interest relating to history and completion of the work request, wherein the service reports are in a format selected from the group comprising electronic format and print format.

9. The method of claim 1 wherein the work request is documented in a format selected from the group comprising a high level abbreviated format and a detailed format tailored to the complexities of work requested.

10. The method of claim 1 wherein the method is web-based on a global computer network.

11. The method of claim 1 wherein the electronic notifications relating to the work request instructions are selected from the group comprising approval authority, authority to proceed, approval of the work request, revisions to the work request, updates to the work request, instructions for building, cancellation of the work request, completion of the work request, changes in quantity of items requested, and revised estimated hours to complete the request.

12. The method of claim 1 wherein the work request at any given time comprises a status selected from the group comprising opened status, in-review status, approved status, in-work status, worked status, completed status, and cancelled status.

13. The method of claim 1 for processing work requests for building parts for spacecraft, aircraft, automobiles, watercraft, and military vehicles.

14. An automated method to be performed in a computing environment for processing a prototype operations work request (POWR), the method comprising the steps of:
receiving the POWR selected from the group comprising a service request, a hardware request, a manufacturing request, build instructions, general labor activities, archived records of requests, or a combination thereof;
inputting the POWR into an electronic database comprising a shared server having a front-end database, a back-end database, and an attachment storage device;
tailoring the POWR, by a user, based on complexity of a product or a service;
creating automated electronic POWR instructions that incorporate an approval/disapproval feature based on estimated hours for the POWR and a charge estimate threshold for the POWR, the charge estimate threshold set by one with approval authority prior to creation of the POWR;
approving or disapproving the POWR based on previously set approval authority within the approval/disapproval feature prior to incurring any costs, wherein if an approval type is "approve", a default authority allows an approver to identify and approve unless a charge is below the charge estimate threshold, wherein if the approval type is "notify", the approver is notified no matter what the charge, and wherein if the approval type is "N/A" (not applicable), no approver is notified and a general approval account can approve the charge;
creating a sequenced series of tasks to be worked sequentially for accomplishing the POWR;
inputting and storing into the electronic database one or more attachments to the POWR, wherein the attachments are created by computer software;
linking the electronic POWR instructions and tasks to multiple networked computers comprising personal computers;
transmitting between the networked computers electronic notifications relating to the POWR instructions and tasks; and,
providing automated service reports filtered on specific data of interest relating to history and completion of the POWR.

15. The method of claim 14 wherein the method is web-based on a global computer network.

16. An automated method to be performed in a computing environment for processing a prototype operations work request (POWR), the method comprising the steps of:
receiving a POWR;
inputting POWR data and instructions into an electronic database;
tailoring the POWR, by a user, based on complexity of a product or a service, the POWR data and instructions being automated and incorporating an approval/disapproval feature based on estimated hours for the POWR and a charge estimate threshold for the POWR, the charge estimate threshold set by one with approval authority prior to creation of the POWR;
approving or disapproving the POWR based on previously set approval authority within the approval/disapproval feature prior to incurring any costs, wherein if an approval type is "approve", a default authority allows an approver to identify and approve unless a charge is below the charge estimate threshold, wherein if the approval type is "notify", the approver is notified no matter what the charge, and wherein if the approval type is "N/A" (not applicable), no approver is notified and a general approval account can approve the charge;
inputting a sequenced series of POWR tasks to be worked sequentially for accomplishing the POWR and storing the POWR in the database;
linking the POWR to multiple networked computers; and,
transmitting between the multiple networked computers electronic notifications relating to revising, approving, building, and completing the POWR.

17. The method of claim 16 wherein the POWR is selected from the group comprising a service request, a hardware request, a manufacturing request, build instructions, general labor activities, archived records of requests, or a combination thereof.

18. The method of claim 16 wherein the electronic database comprises a shared server having a front-end database, a back-end database, and an attachment storage device.

19. The method of claim 16 wherein the POWR comprises data selected from the group comprising title of the request, description of the work requested, project, program, work provider type, work provider location, work provider point of contact, requesting point of contact, associated reference number, background information for work requested, supporting information for work requested, overhead approver, hours for work request, charge number, estimated hours to complete work requested, task materials needed for the work requested, location of materials, material certification, work tasks, task number, requester department, quantity of requested materials, estimated completion date, task description, assign material, identification of requester, date of work request, identification of approver, date of approval of work request, date work started on work request, date work request closed, identification of closer of work request, delivery contact, reference numbers to interface with other systems, work instructions including sign-off authorization, and nomenclature of requested hardware or service and references.

20. The method of claim 16 further comprising the step of inputting and storing into the electronic database one or more attachments to the POWR, wherein the attachments are created by computer software.

21. The method of claim 16 wherein the multiple networked computers are personal computers.

22. The method of claim 16 further comprising generating automated electronic service reports filtered on specific data of interest relating to history and completion of the POWR, wherein the service reports are in a format selected from the group comprising electronic format and print format.

23. The method of claim 16 wherein the POWR is documented in a format selected from the group comprising a high level abbreviated format and a detailed format tailored to the complexities of work requested.

24. The method of claim 16 wherein the method is web-based on a global computer network.

25. The method of claim 16 wherein the POWR at any given time comprises a status selected from the group comprising opened status, in-review status, approved status, in-work status, worked status, completed status, and cancelled status.

26. The method of claim 16 for processing work requests for building parts for spacecraft, aircraft, automobiles, watercraft, and military vehicles.

27. The method of claim 16 wherein the electronic notifications comprise electronic approval notifications for revising and updating the POWR and the POWR is in an in-review status.

28. The method of claim 16 wherein the electronic notifications comprise electronic approval notifications for approving the POWR and the POWR is in an approved status.

29. The method of claim 16 wherein the electronic notifications comprise electronic notifications for instructions for building or aborting the POWR and the POWR is in an in-work status.

30. The method of claim 16 wherein the electronic notifications comprise electronic notifications for building the POWR and the POWR is in a worked status.

31. The method of claim 16 wherein the electronic notifications comprise electronic notifications for providing real-time completion status of the POWR and the POWR is in a completed status.

32. An automated method for processing a prototype operations work request (POWR), the method to be performed in a computing environment comprising one or more computer communications and networking devices linking a shared server with multiple user terminals, the method comprising the steps of:
  receiving a POWR selected from the group comprising a service request, a hardware request, a manufacturing request, build instructions, general labor activities, archived records of requests, or a combination thereof;
  inputting POWR data and instructions into an electronic database comprising the shared server having a front-end database, a back-end database, and an attachment storage device;
  tailoring the POWR, by a user, based on complexity of a product or a service, the POWR data and instructions being automated and the POWR incorporating an approval/disapproval feature based on estimated hours for the work request and a charge estimate threshold for the POWR, the charge estimate threshold set by one with approval authority prior to creation of the POWR;
  approving or disapproving the POWR based on previously set approval authority within the approval/disapproval feature prior to incurring any costs, wherein if an approval type is "approve", a default authority allows an approver to identify and approve unless a charge is below the charge estimate threshold, wherein if the approval type is "notify", the approver is notified no matter what the charge, and wherein if the approval type is "N/A" (not applicable), no approver is notified and a general approval account can approve the charge;
  inputting a sequenced series of POWR tasks to be worked sequentially for accomplishing the POWR and storing the POWR in the database, wherein the POWR is in an opened status;
  inputting and storing into the electronic database one or more attachments to the POWR, wherein the attachments are created by computer software;
  linking the opened POWR to multiple networked computers comprising personal computers;
  transmitting between the multiple networked computers electronic notifications relating to the POWR, wherein the electronic notifications comprise,
    (a) electronic approval notifications for revising and updating the POWR, wherein the POWR is in an in-review status;
    (b) electronic approval notifications for approving the POWR, wherein the POWR is in an approved status;
    (c) electronic notifications for instructions for building or aborting the POWR, wherein the POWR is in an in-work status;
    (d) electronic notifications for building the POWR, wherein the POWR is in a worked status; and,
    (e) electronic notifications for providing real-time completion status of the POWR, wherein the POWR is in a completed status;
  generating automated electronic service reports at any POWR status filtered on specific data of interest relating to history and completion of the POWR, wherein the service reports are in a format selected from the group comprising electronic format and print format.

33. The method of claim 32 for processing the POWR for building parts for spacecraft, aircraft, automobiles, watercraft, and military vehicles.

34. The method of claim 32 wherein the method is web-based on a global computer network.

35. An automated system for use in a computing environment for processing a work request, the system comprising:
  a shared server comprising a front-end database, a back-end database, and an attachment storage device, wherein the shared server saves and retains a work request that is input into the server, wherein the work request is tailored by a user based on complexity of a product or a service, and the work request incorporates an automated approval/disapproval feature based on estimated hours for the work request and a charge estimate threshold for the work request, the charge estimate threshold set by one with approval authority prior to creation of the work request, the approval/disapproval feature deciding to either approve or disapprove the work request based on previously set approval authority prior to incurring any costs, wherein if an approval type is "approve", a default authority allows an approver to identify and approve unless a charge is below the charge estimate threshold, wherein if the approval type is "notify", the approver is notified no matter what the charge, and wherein if the approval type is "N/A" (not applicable), no approver is notified and a general approval account can approve the charge, one or more computer communications and networking devices for linking the shared server with multiple user terminals, wherein the multiple user terminals comprise personal computers having network access for accessing the work request and sending and receiving automated information relating to the processing and completion of the work request; and, supporting electronics devices to assist the multiple user terminals in accessing the work request and sending and receiving the automated information relating to the processing and completion of the work request.

36. The system of claim 35 wherein the work request is a prototype operations work request (POWR) selected from the group comprising a service request, a hardware request, a manufacturing request, build instructions, general labor activities, archived records of requests, or a combination thereof.

37. The system of claim 35 wherein the attachment storage device saves and stores one or more attachments to the work request, and wherein the attachments are created by computer software.

38. The system of claim 35 wherein the computer communications and networking device comprises a network server.

39. The system of claim 35 wherein the multiple user terminals comprise a start work request database link, a copy or update from front-end database feature, and a run front-end on local terminal feature.

40. The system of claim 35 wherein the supporting electronics devices comprise input devices and output devices.

41. The system of claim 40 wherein the input devices comprise scanners, bar code readers, and cameras.

42. The system of claim 40 wherein the output devices comprise printers and displays.

43. The system of claim 35 wherein the system is web-based on a global computer network.

44. An automated system for use in a computing environment for processing a prototype operations work request (POWR), the POWR selected from the group comprising a service request, a hardware request, a manufacturing request, build instructions, general labor activities, archived records of requests, or a combination thereof, the system comprising:

a shared server comprising a front-end database, a back-end database, and an attachment storage device, wherein the shared server saves and retains the POWR that is input into the server, the POWR being tailored by the user based on complexity of a product or a service, and further wherein the attachment storage device saves and stores one or more attachments created by computer software to the POWR, wherein the POWR incorporates an automated approval/disapproval feature based on estimated hours for the work request and a charge estimate threshold for the work request, the charge estimate threshold set by one with approval authority prior to creation of the POWR, the approval/disapproval feature deciding to either approve or disapprove the work request based on previously set approval authority prior to incurring any costs, wherein if an approval type is "approve", a default authority allows an approver to identify and approve unless a charge is below the charge estimate threshold, wherein if the approval type is "notify", the approver is notified no matter what the charge, and wherein if the approval type is "N/A" (not applicable), no approver is notified and a general approval account can approve the charge;

one or more computer communications and networking devices for linking the shared server with multiple user terminals, wherein the multiple user terminals comprise personal computers having network access for accessing the POWR and sending and receiving automated information relating to the processing and completion of the POWR, and further wherein the multiple user terminals comprise a start POWR database link, a copy or update from front-end database feature, and a run front-end on local terminal feature; and, supporting electronics devices to assist the multiple user terminals in accessing the POWR and sending and receiving the automated information relating to the processing and completion of the POWR, wherein the supporting electronics devices comprise input devices selected from the group comprising scanners, bar code readers, and cameras, and further comprise output devices selected from the group comprising printers and displays.

45. The system of claim 44 wherein the system is web-based on a global computer network.

* * * * *